US011711477B2

(12) United States Patent
Enomoto et al.

(10) Patent No.: US 11,711,477 B2
(45) Date of Patent: Jul. 25, 2023

(54) IMAGE PROCESSING APPARATUS, IMAGE PROCESSING SYSTEM, AND STORAGE MEDIUM STORING PROGRAM

(71) Applicant: BROTHER KOGYO KABUSHIKI KAISHA, Nagoya (JP)

(72) Inventors: Katsunori Enomoto, Toyokawa (JP); Satoshi Tanimoto, Nagoya (JP); Shinsuke Kaigawa, Kitanagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/806,098

(22) Filed: Jun. 9, 2022

(65) Prior Publication Data

US 2023/0007139 A1 Jan. 5, 2023

(30) Foreign Application Priority Data

Jun. 30, 2021 (JP) .................................. 2021-108374

(51) Int. Cl.
*H04N 1/00* (2006.01)
(52) U.S. Cl.
CPC ....... *H04N 1/00973* (2013.01); *H04N 1/0097* (2013.01); *H04N 1/00244* (2013.01); *H04N 2201/0094* (2013.01)
(58) Field of Classification Search
CPC ....... H04N 2201/0094; H04N 1/00244; H04N 2201/0039; H04N 1/4413; H04N 2201/0055; H04N 1/00307; H04N 2201/0082; H04N 1/00411; H04N 2201/0041; H04N 2201/0053;
(Continued)

(56) References Cited

U.S. PATENT DOCUMENTS

2016/0255245 A1* 9/2016 Ishibashi ................. H04W 8/22
358/1.14
2016/0299730 A1* 10/2016 Tsunekawa ........... G06F 3/1215
(Continued)

FOREIGN PATENT DOCUMENTS

JP 2018-32891 A 3/2018

*Primary Examiner* — Negussie Worku
(74) *Attorney, Agent, or Firm* — Scully, Scott, Murphy & Presser, PC

(57) ABSTRACT

A controller is configured to: acquire first access information indicating a transmission source of instruction data; receive the instruction data based on the first access information; in response to receiving input-type instruction data, input content data of a storage target based on input method information included in the input-type instruction data, and store resource data in which the inputted content data is associated with resource identification information included in the input-type instruction data; in response to receiving output-type instruction data, read resource data corresponding to resource identification information included in the output-type instruction data, and output the content data associated with the resource identification information of the read resource data based on output method information included in the output-type instruction data; and in response to receiving the instruction data including reception instruction information, receive next instruction data based on second access information associated with the reception instruction information.

17 Claims, 18 Drawing Sheets

(58) Field of Classification Search
CPC ......... H04N 1/00283; H04N 1/00403; H04N 1/00488; H04N 1/00854; H04N 1/00938; H04N 1/32534; H04N 1/32582; H04N 1/442; H04N 7/16; H04N 2201/3205; H04N 2201/3278; H04N 2201/3214; H04N 2201/3215; H04N 5/77; H04N 1/00347; H04N 23/64; H04N 1/00416; H04N 1/32767; H04N 2201/0084; H04N 2101/00; H04N 2201/3216; H04N 23/611; H04N 1/32101; H04N 21/4312; H04N 23/80; H04N 7/181; H04N 2201/3226; H04N 21/433; H04N 2201/3202; H04N 2201/3219; H04N 2201/3221; H04N 23/69; H04N 23/695; H04N 5/74; H04N 2201/0049; H04N 2201/3246; H04N 2201/3276; H04N 7/18; H04N 1/2112; H04N 2201/3273; H04N 1/00291; H04N 1/00342; H04N 1/00885; H04N 1/00891; H04N 1/00962; H04N 2201/006; H04N 2201/3222; H04N 2201/3232; H04N 2201/3249; H04N 2201/33321; H04N 2201/33328; H04N 2201/33335; H04N 2201/33378; H04N 9/3173; H04N 1/00323; H04N 1/00442; H04N 1/387; H04N 1/4433; H04N 2201/3253; H04N 2201/3274; H04N 23/661; H04N 7/183; H04N 1/00474; H04N 1/32005; H04N 1/32037; H04N 1/32085; H04N 1/32106; H04N 1/32363; H04N 1/324; H04N 1/32438; H04N 1/32502; H04N 1/32507; H04N 1/32523; H04N 1/3878; H04N 21/25875; H04N 21/4627; H04N 21/8355; H04N 2201/001; H04N 2201/3208; H04N 2201/3288; H04N 2201/3295; H04N 2201/3298; H04N 5/772; H04N 7/163; H04N 7/188; H04N 9/8042; H04N 9/8205; H04N 1/00344; H04N 1/32117; H04N 1/32122; H04N 1/32272; H04N 21/4316; H04N 21/435; H04N 21/439; H04N 21/4788; H04N 2201/0087; H04N 1/00204; H04N 1/00233; H04N 1/00326; H04N 1/0035; H04N 1/00427; H04N 1/00432; H04N 1/00633; H04N 1/00973; H04N 1/04; H04N 1/32128; H04N 1/32496; H04N 1/32587; H04N 1/32593; H04N 1/32603; H04N 1/4486; H04N 2005/91364; H04N 21/214; H04N 21/234372; H04N 21/2347; H04N 21/23476; H04N 21/235; H04N 21/2362; H04N 21/2541; H04N 21/2543; H04N 21/2547; H04N 21/4122; H04N 21/41407; H04N 21/4143; H04N 21/4184; H04N 21/42646; H04N 21/4318; H04N 21/4325; H04N 21/4334; H04N 21/4345; H04N 21/43635; H04N 21/43637; H04N 21/4405; H04N 21/44204; H04N 21/44222; H04N 21/443; H04N 21/4753; H04N 21/4826; H04N 21/4858; H04N 21/6581; H04N 21/8166; H04N 21/835; H04N 21/83555; H04N 21/8358; H04N 2201/0096; H04N 2201/3204; H04N 2201/3212; H04N 2201/3242; H04N 23/61; H04N 23/70; H04N 23/741; H04N 23/743; H04N 5/76; H04N 5/913; H04N 7/162; H04N 7/17309; H04N 1/00; H04N 1/00132; H04N 1/00175; H04N 1/00188; H04N 1/00278; H04N 1/0032; H04N 1/00424; H04N 1/00482; H04N 1/00493; H04N 1/00506; H04N 1/00514; H04N 1/00517; H04N 1/00567; H04N 1/00591; H04N 1/00965; H04N 1/0097; H04N 1/215; H04N 1/32; H04N 1/3935; H04N 1/4426; H04N 13/106; H04N 13/363; H04N 21/23; H04N 21/231; H04N 21/23106; H04N 21/236; H04N 21/2393; H04N 21/25833; H04N 21/2668; H04N 21/41415; H04N 21/436; H04N 21/4383; H04N 21/4402; H04N 21/440245; H04N 21/47202; H04N 21/4728; H04N 21/4781; H04N 21/4852; H04N 21/6587; H04N 2201/0013; H04N 2201/0015; H04N 2201/0065; H04N 2201/0075; H04N 2201/0081; H04N 2201/0089; H04N 2201/3229; H04N 2201/3247; H04N 2213/002; H04N 23/60; H04N 23/62; H04N 23/631; H04N 23/632; H04N 23/633; H04N 23/66; H04N 5/265; H04N 5/50; H04N 5/642; H04N 5/782; H04N 5/907; H04N 5/915; H04N 7/17318; H04N 9/31; H04N 9/87; G06F 3/1288; G06F 3/167; G06F 3/14; G06F 3/1292; G06F 3/1226; G06F 3/1238; G06F 3/1236; G06F 3/04842; G06F 3/122; G06F 3/1247; G06F 3/1286; G06F 3/0481; G06F 3/0488; G06F 3/1203; G06F 3/1205; G06F 3/1208; G06F 3/1253; G06F 3/128; G06F 3/1285; G06F 3/1228; G06F 3/1229; G06F 3/1245; G06F 3/1258; G06F 3/1284; G06F 3/162; G06F 21/608; G06F 3/1204; G06F 3/011; G06F 3/017; G06F 3/01; G06F 21/6209; G06F 2221/2101; G06F 2221/2149; G06F 3/0482; G06F 3/0484; G06F 3/147; G06F 21/30; G06F 3/044; G06F 3/0425; G06F 3/126; G06F 16/2452; G06F 16/258; G06F 16/3329; G06F 16/583; G06F 16/638; G06F 18/217; G06F 21/10; G06F 2203/04104; G06F 3/041; G06F 3/1206; G06F 3/1222; G06F 3/1265; G06F 3/1268; G06F 3/1296; G06F 3/1423; G06F 40/274; G06F 40/56; G06F 1/163; G06F 21/31; G06F 2203/04806; G06F 3/0487; G06F 3/1454; G06F 15/16; G06F 18/00; G06F 18/2178; G06F 2206/1508; G06F 2211/005; G06F 3/012; G06F 3/04815; G06F 3/12; G06F 3/1207; G06F 3/1211; G06F 3/1217; G06F 3/1232; G06F 3/124; G06F 3/1259; G06F 3/1261; G06F 3/1276; G06F 3/1291; G06F 3/1293; G06F 3/16; G06F 11/1662; G06F 11/2094; G06F 16/9024; G06F 16/906; G06F 18/24; G06F 18/2411; G06F 2009/45562; G06F 2009/45575; G06F 2009/45583; G06F 21/32; G06F 21/33; G06F 21/71; G06F 21/86; G06F 2201/815; G06F 2201/82; G06F 2203/011; G06F 2211/007; G06F 2221/0737; G06F 2221/0797; G06F
2221/2135; G06F 2221/2137; G06F
2221/2151; G06F 2221/2153; G06F
3/013; G06F 3/033; G06F 3/0346; G06F
3/0354; G06F 3/04845; G06F 3/0486;
G06F 3/1212; G06F 8/24; G06F 8/433;
G06F 8/65; G06F 8/71; G06F 9/45558;
G06F 16/38; G06F 16/51; G06F 16/71;
G06F 16/73; G06F 16/739; G06F 16/785;
G06F 16/951; G06F 18/2132; G06F
18/22; G06F 18/24323; G06F 21/44;
G06F 2203/012; G06F 2203/04808; G06F
2221/0755; G06F 3/016; G06F 3/03;
G06F 3/0304; G06F 3/04162; G06F
3/04166; G06F 3/042; G06F 3/04847;
G06F 3/04883; G06F 3/1446; G06F
3/1462; G06F 3/165; G06F 30/13; G06F
40/197; G06F 9/44; G06F 9/4411; G06F
9/451; H04L 67/51; H04L 67/303; H04L
63/08; H04L 67/02; H04L 67/04; H04L
63/0272; H04L 63/029; H04L 63/0428;
H04L 51/00; H04L 67/1001; H04L
67/10015; H04L 67/306; H04L 67/53;
H04L 67/55; H04L 69/329; H04L 67/563;
H04L 67/125; H04L 67/565; H04L 9/40;
H04L 12/2809; H04L 12/2812; H04L
2012/2841; H04L 2012/2849; H04L
63/0281; H04L 12/2823; H04L 12/40013;
H04L 2463/062; H04L 41/082; H04L
63/1408; H04L 67/535; H04L 67/59;
H04L 51/063; H04L 51/224; H04L
67/567; H04L 67/63; H04L 12/22; H04L
51/046; H04L 51/066; H04L 51/56; H04L
67/12; H04L 67/5651; H04L 1/0002;
H04L 1/004; H04L 1/0041; H04L 1/18;
H04L 12/66; H04L 2209/60; H04L
43/045; H04L 47/122; H04L 5/0064;
H04L 67/1097; H04L 67/52; H04L 67/56;
H04L 69/00; H04L 9/0861; H04L
2209/56; H04L 2463/101; H04L
2463/102; H04L 2463/103; H04L 51/58;
H04L 63/02; H04L 63/04; H04L 63/0435;
H04L 63/0442; H04L 63/0823; H04L
63/083; H04L 63/10; H04L 63/12; H04L
63/123; H04L 63/16; H04L 63/168; H04L
63/20; H04L 65/40; H04L 65/75; H04L
67/01; H04L 67/131; H04L 67/145; H04L
67/148; H04L 67/288; H04L 67/568;
H04L 67/75; H04L 9/006; H04L 9/0819;
H04L 9/0838; H04L 9/3218; H04L
9/3247; H04L 9/3263; H04L 12/2805;
H04L 12/2834; H04L 12/2838; H04L
2012/285; H04L 2101/365; H04L 51/10;
H04L 61/30; H04L 63/0492; H04L
9/0643; H04L 9/0869; H04L 9/0891;
H04L 9/32; G06Q 20/10; G06Q 50/10;
G06Q 30/0272; G06Q 30/0273; G06Q
10/107; G06Q 10/20; G06Q 30/0238;
G06Q 30/06; G06Q 50/22; G06Q 10/10;
G06Q 20/14; G06Q 30/0208; G06Q
30/0242; G06Q 30/0643; G06Q 40/02;
G06Q 10/109; G06Q 20/102; G06Q
20/12; G06Q 20/209; G06Q 30/08; G06Q
50/01; G06Q 50/14; G06Q 10/06313;
G06Q 10/06375; G06Q 10/06395; G06Q
10/087; G06Q 20/02; G06Q 20/023;
G06Q 20/04; G06Q 20/085; G06Q
20/123; G06Q 20/1235; G06Q 20/20;
G06Q 20/202; G06Q 20/204; G06Q
20/24; G06Q 20/306; G06Q 20/308;
G06Q 20/327; G06Q 2220/16; G06Q
30/02; G06Q 30/0261; G06Q 30/0267;
G06Q 30/0269; G06Q 30/0283; G06Q
30/0601; G06Q 30/0609; G06Q 30/0639;
G06Q 40/04; G06Q 40/12; G06Q 50/04;
G06Q 50/184; G06Q 50/188; G06Q
50/30; G06Q 10/06311; G06Q 10/063112;
G06Q 10/06316; G06Q 20/06; G06Q
20/145; G06Q 20/201; G06Q 20/208;
G06Q 20/28; G06Q 20/32; G06Q 20/322;
G06Q 20/3224; G06Q 20/3276; G06Q
20/3278; G06Q 20/341; G06Q 20/346;
G06Q 20/385; G06Q 30/0207; G06Q
30/0226; G06Q 30/0631; G06Q 30/0641;
G06Q 40/00; G06Q 40/128; G06T
19/006; G06T 19/00; G06T 7/0002; G06T
2207/20081; G06T 15/503; G06T 17/05;
G06T 19/20; G06T 2207/20084; G06T
2215/16; G06T 2219/024; G06T 7/0004;
G06T 11/206; G06T 15/00; G06T 15/20;
G06T 2200/24; G06T 2219/004; G06T
2219/2004; G06T 2219/2016; G06T 7/70;
G06T 1/0021; G06T 1/20; G06T
2207/10024; G06T 2207/10028; G06T
2207/20024; G06T 2207/20064; G06T
2207/20104; G06T 2207/30168; G06T
3/40; G06T 5/10; G06T 5/30; G06T
7/0014; G06T 7/11; G06T 7/13; G06T
7/136; G06T 7/194; G06T 7/30; G06T
7/33; G06T 7/344; G06T 7/55; G06T
7/593; G06T 11/60; G06T 2207/30041;
G06T 2210/16; G06T 7/00; G06T 7/0012

USPC ...................................................... 358/1.15

See application file for complete search history.

(56) References Cited

U.S. PATENT DOCUMENTS

| | | | |
|---|---|---|---|
| 2017/0272584 A1* | 9/2017 | Tatsuma | H04N 1/2338 |
| 2017/0302823 A1* | 10/2017 | Saito | H04N 1/4433 |
| 2018/0004464 A1* | 1/2018 | Sone | G06F 3/1292 |
| 2018/0054540 A1 | 2/2018 | Okuno | |
| 2021/0373832 A1* | 12/2021 | Suzuki | H04N 1/00244 |
| 2022/0327338 A1* | 10/2022 | Enomoto | G06K 15/1817 |
| 2023/0019642 A1* | 1/2023 | Sato | H04N 1/00344 |

* cited by examiner

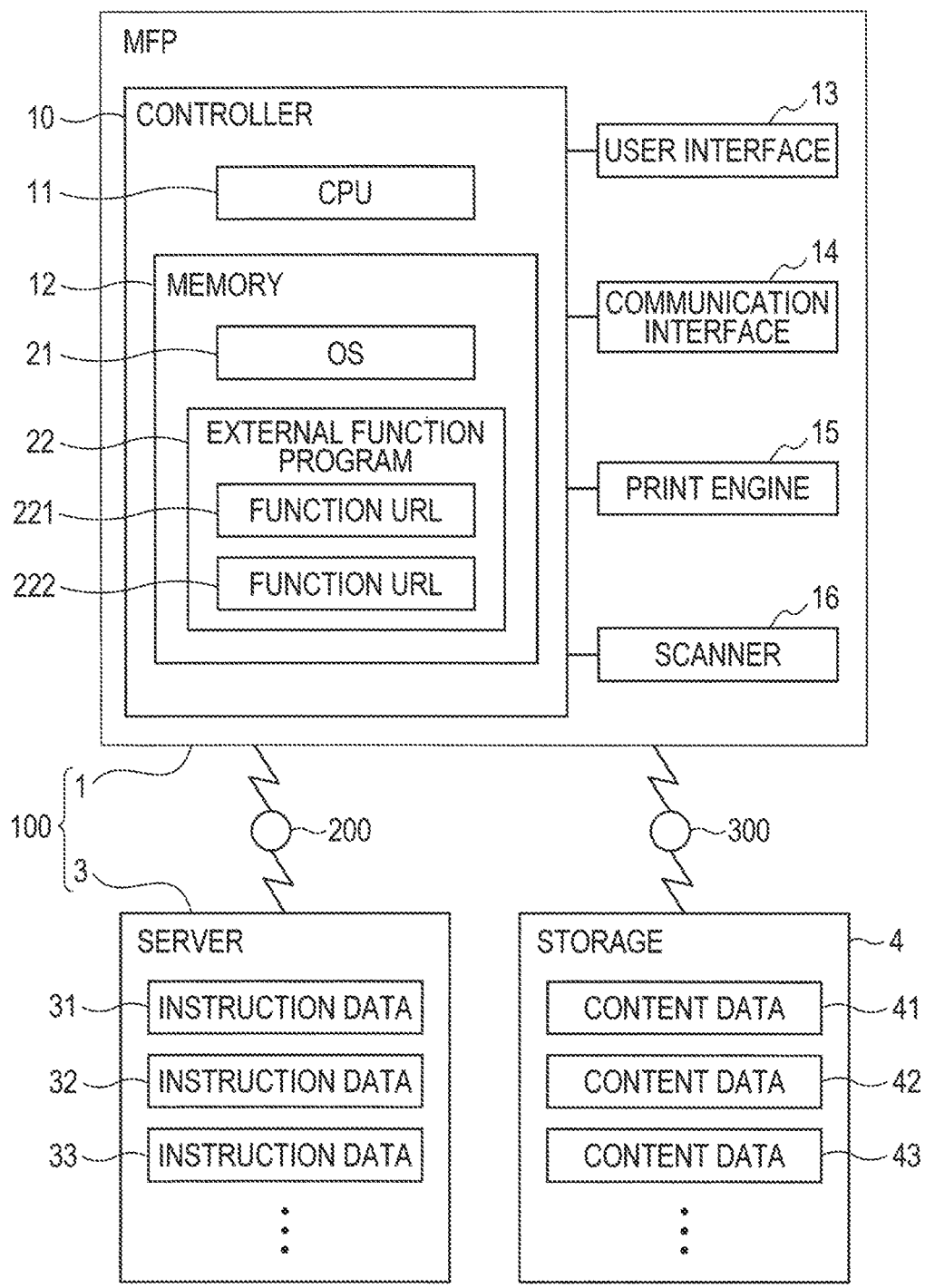

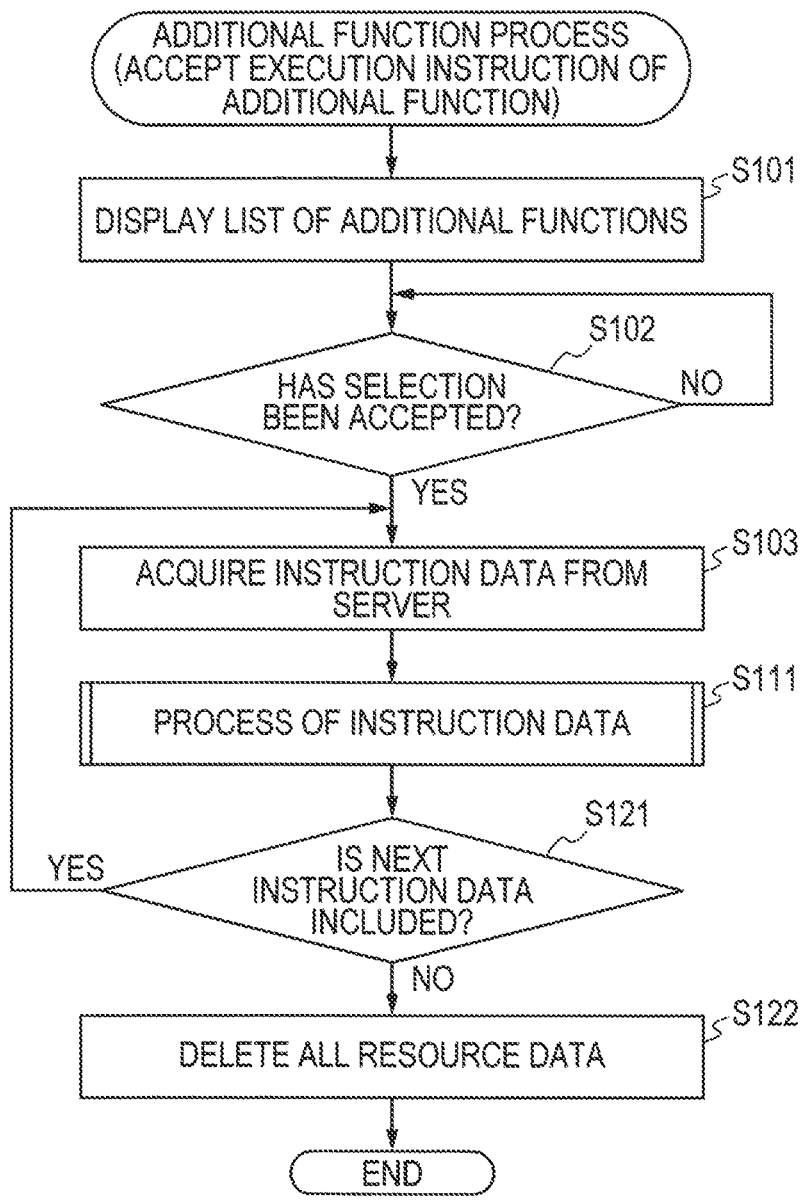

```
511 { <Scan>
512 {    <Color>Gray</Color>
         <Resolution>High</Resolution>
         <DocSize>A4</DocSize>
513 {    <Resource>scan_data</Resource>
514 {    <NextUrl>http://www.server-c.com/scan_out.xml</NextUrl>
      </Scan>
```

```
<Input>
    <Path>http://www.server-d.com/maker_logo.jpg</Path>
    <Resource>logo</Resource>
    <NextUrl>http://www.server-c.com/input.layout.xml</NextUrl>
</Input>
```

521: `<Input>`
522: `<Path>...`
523: `<Resource>...`
524: `<NextUrl>...`

```
<Print>
  <PaperSize>A4</PaperSize>
  <Resource>scan_out</Resource>
  <NextUrl>http://www.server-c.com/output_scan.xml</NextUrl>
</Print>
```

531: `<Print>`
532: `<PaperSize>A4</PaperSize>`
533: `<Resource>scan_out</Resource>`
534: `<NextUrl>http://www.server-c.com/output_scan.xml</NextUrl>`

53

```
541 { <Output>
542 {   <Resource>scan_out</Resource>
        <CifsTx>
          <Host>192.168.1.10</Host>
          <StoreDir>scan_data</StoreDir>
543 {     <FileName>scan00023.pdf</FileName>
          <User>public</User>
          <Password>ik03sdf</Password>
        </CifsTx>
      </Output>
```

FIG. 7A

```
<Process>
  <Type>Convert</Type>
  <InResource>scan_data</InResource>
  <OutResource>scan_out</OutResource>
  <FileFormat>PDF</FileFormat>
  <NextUrl>http://www.server-c.com/print.xml</NextUrl>
</Process>
```

551: `<Process>`
552: `<Type>Convert</Type>`
553: `<InResource>scan_data</InResource>`
554: `<OutResource>scan_out</OutResource>`
555: `<FileFormat>PDF</FileFormat>`
556: `<NextUrl>http://www.server-c.com/print.xml</NextUrl>`

55

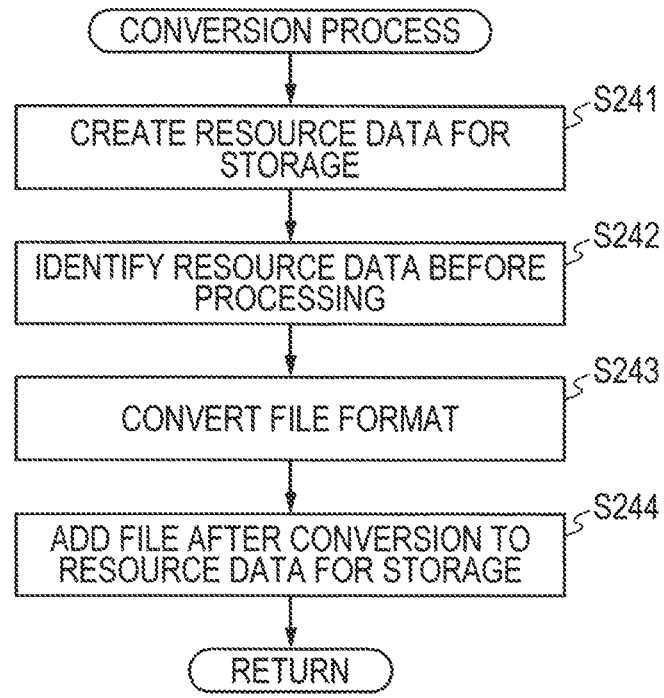

```
<Process>
    <Type>Composition</Type>
    <InResource>scan_data1</InResource>
    <InResource>scan_data2</InResource>
    <OutResource>scan_out</OutResource>
    <FileFormat>PDF</FileFormat>
    <NextUrl>http://www.server-c.com/print.xml</NextUrl>
</Process>
```

561: `<Process>`
562: `<Type>Composition</Type>`
563: `<InResource>scan_data1</InResource>` `<InResource>scan_data2</InResource>`
564: `<OutResource>scan_out</OutResource>`
565: `<FileFormat>PDF</FileFormat>`
566: `<NextUrl>http://www.server-c.com/print.xml</NextUrl>`

```
<Process>
    <Type>Composition</Type>
    <InResource>layout</InResource>
    <OutResource>print</OutResource>
    <FileFormat>PDF</FileFormat>
    <NextUrl>http://www.server-c.com/print.xml</NextUrl>
</Process>
```

571: `<Process>`
572: `<Type>Composition</Type>`
573: `<InResource>layout</InResource>`
574: `<OutResource>print</OutResource>`
575: `<FileFormat>PDF</FileFormat>`
576: `<NextUrl>http://www.server-c.com/print.xml</NextUrl>`

```
<Input>
  <Path>http://www.server-d.com/layout_data.xml</Path>
  <Resource>layout</Resource>
  <NextUrl>http://www.server-c.com/process.xml</NextUrl>
</Input>
```

521: `<Input>`
522: `<Path>...`
523: `<Resource>...`
524: `<NextUrl>...`

```
<document>
  <size fixed='A4' orientation='portrait'/>

<image>
      <resource id='scan_data'/>
      <sizefixed='A4' orientation='portrait'/>
    </image>
    <image>
      <resource id='logo'/>
      <locate x='5' y='280'/>
    </image>

</document>
```

581: `<size ...>`
582: `<image> ... </image>` (scan_data)
583: `<image> ... </image>` (logo)

```
<Process>
  <Type>Replace</Type>
  <InResource>profile</InResource>
  <OutResource>profile_out</OutResource>
  <FileFormat>PDF</FileFormat>
  <NextUrl>http://www.server-c.com/output_scan.xml</NextUrl>
</Process>
```

591 { `<Process>`
592 { `<Type>Replace</Type>`
593 { `<InResource>profile</InResource>`
594 { `<OutResource>profile_out</OutResource>`
595 { `<FileFormat>PDF</FileFormat>`
596 { `<NextUrl>http://www.server-c.com/output_scan.xml</NextUrl>`

FIG. 11B

```
<scan_profile>
  <user>%%LOGINUSER%%</user>
  <datetime>%%TIMESTAMP%%</datetime>
  <device_id>%%SERIALNO%%</device_id>
  <ip_addr>%%IPADDRESS%%</ip_addr>
  <scan_parameters>
    <color>%%SCAN_COLOR%%</color>
    <resolution>%%SCAN_RESOLUTION%%</resolution>
    <pages>%%SCAN_PAGES%%</pages>
  </scan_parameters>
</scan_profile>
```

FIG. 11C

```
<scan_profile>
  <user>yamamoto</user>
  <datetime>2021/05/10 17:35:40</datetime>
  <device_id>54N1290478</device_id>
  <ip_addr>192.168.1.188</ip_addr>
  <scan_parameters>
    <color>Gray</color>
    <resolution>600</resolution>
    <pages>3</pages>
  </scan_parameters>
</scan_profile>
```

IMAGE PROCESSING APPARATUS, IMAGE PROCESSING SYSTEM, AND STORAGE MEDIUM STORING PROGRAM

REFERENCE TO RELATED APPLICATIONS

This application claims priority from Japanese Patent Application No. 2021-108374 filed on Jun. 30, 2021. The entire content of the priority application is incorporated herein by reference.

BACKGROUND ART

Conventionally, an image processing system including an image processing apparatus and a server is known.

DESCRIPTION

In an image processing system, an image processing apparatus accesses a server, analyzes instruction data sent from the server, and performs a series of processes including a process related to input and a process related to output according to the instruction data. As the series of processes, the image processing apparatus performs "download printing" of downloading a document from a storage and printing the document, and "scan upload" of scanning a document and uploading the scanned image data to a storage, for example. The instruction data may include execution instructions of download printing and scan upload. In a case where the instruction data includes an execution instruction for scan upload, for example, the image processing apparatus performs scan upload according to the instruction data.

In the instruction data, in order to execute a series of processes including a process related to input and a process related to output, such as "download printing" and "scan upload", an input process and an output process are provided as a fixed set. Therefore, in the above-described instruction data, it is difficult to customize the process, and a series of processes to be executed according to the instruction data has low flexibility (a low degree of freedom). For example, it is not possible to perform processing of scanning a document with a scanning function, uploading the scanned image data to a storage, and performing printing based on the image data.

This specification discloses a technique for, in an image processing apparatus that executes processes based on instruction data, increasing flexibility of a series of processes to be executed according to the instruction data.

According to one aspect, this specification discloses an image processing apparatus. The image processing apparatus includes a communication interface and a controller. The controller is configured to: acquire first access information indicating a transmission source of instruction data, the instruction data being data instructing the image processing apparatus to execute a process, the image processing apparatus being configured to execute an input-type process and an output-type process, an input-type instruction data being the instruction data indicating the input-type process, the input-type instruction data being one kind of the instruction data, the input-type instruction data including input process information, the input-type instruction data including input method information and input resource identification information, the input method information indicating an input method, the input resource identification information identifying resource data to be stored, an output-type instruction data being the instruction data indicating the output-type process, the output-type instruction data being one kind of the instruction data, the output-type instruction data including output process information, the output-type instruction data including output method information and output resource identification information, the output method information indicating an output method, the output resource identification information identifying resource data to be read, the instruction data further including reception instruction information instructing the image processing apparatus to receive next instruction data, the reception instruction information being associated with second access information indicating a transmission source of the next instruction data; receive, via the communication interface, the instruction data transmitted from the transmission source of the instruction data based on the acquired first access information; in response to receiving the input-type instruction data, input content data of a storage target by the input method corresponding to the input method information, the input method information being information included in the received input-type instruction data, and store resource data in which the inputted content data is associated with the input resource identification information included in the received input-type instruction data; in response to receiving the output-type instruction data, read the resource data corresponding to the output resource identification information included in the received output-type instruction data, and output the content data associated with the output resource identification information of the read resource data by the output method corresponding to the output method information, the output method information being information included in the received output-type instruction data, wherein in a case where the content data of an output target is image data, an image indicated by the image data is outputted; and in response to receiving the instruction data including the reception instruction information, receive, via the communication interface, the next instruction data from the transmission source of the next instruction data based on the second access information associated with the reception instruction information.

According to a technique disclosed in this specification, instruction data may include input process information or output process information, and an instruction to receive next instruction data continuously from one instruction data may be included by reception instruction information. Further, resource data which is content data associated with resource identification information is handed over from an input process to an output process by using the resource identification information, thereby allowing processes described in instruction data to be prepared separately for the input process and the output process. This allows, for a series of processes based on instruction data, customizing of a combination of a process related to input and a process related to output, and increases flexibility of a series of processes executable by the instruction data.

An image processing system including the image processing apparatus, a control method for realizing the function of the image processing apparatus, a computer program, and a computer-readable storage medium for storing the computer program are also new and useful and are disclosed herein.

According to the technique disclosed herein, in an image processing apparatus that executes processes based on instruction data, a technique is realized for increasing flexibility of a series of processes to be executed according to the instruction data.

Embodiments in accordance with this disclosure will be described in detail with reference to the following figures wherein:

FIG. 1 is a block diagram showing the electrical configuration of an image processing system;

FIG. 2 is a flowchart showing the procedure of an additional function process;

FIG. 7A is an explanatory diagram showing an example of instruction data of a conversion instruction;

FIG. 7B is a flowchart showing the procedure of a conversion process;

FIG. 8A is an explanatory diagram showing an example of instruction data of a composition instruction;

FIG. 8B is an explanatory diagram showing an example of instruction data of a composition instruction;

FIG. 9A is an explanatory diagram showing an example of instruction data for inputting layout information;

FIG. 9B is an explanatory diagram showing an example of layout information;

FIG. 11A is an explanatory diagram showing an example of instruction data of replacement instruction;

FIG. 11B is an explanatory diagram showing an example of instruction data before replacement;

FIG. 11C is an explanatory diagram showing an example of instruction data after replacement;

Figures 3A, 3B:
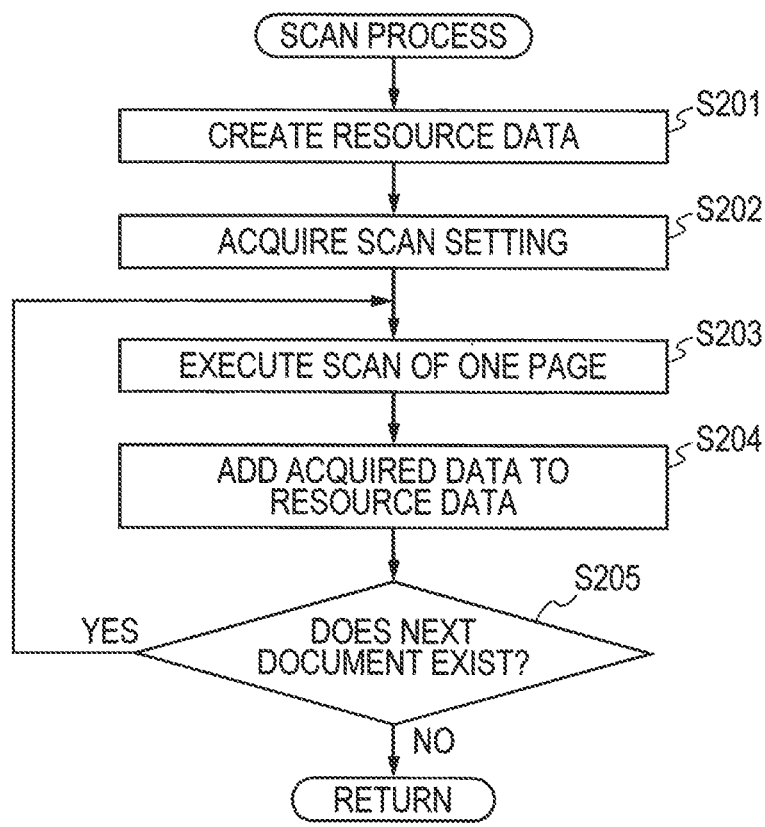
FIG. 3A is an explanatory diagram showing an example of instruction data of a scan instruction.
FIG. 3B is a flowchart showing the procedure of a scan process.

Hereinafter, an image processing system of an embodiment will be described in detail with reference to the attached drawings. An image processing system 100 of the embodiment includes, for example, a multifunction peripheral (hereinafter, referred to as "MFP") 1 and a server 3 as shown in FIG. 1, and these are connectable to each other via a network 200. The MFP 1 is further connectable to a storage 4 via a network 300. The MFP 1 is an example of an image processing apparatus.

As shown in FIG. 1, the MFP 1 of this embodiment includes a controller 10 including a CPU 11 and a memory 12. Further, the MFP 1 includes a user interface (hereinafter also referred to as "user IF") 13, a communication interface (hereinafter also referred to as "communication IF") 14, a print engine 15, and a scanner 16, and these are electrically connected to the controller 10. The CPU 11 may be an example of a controller.

The CPU 11 executes various processes according to a program read from the memory 12 and based on a user's operation. As shown in FIG. 1, the memory 12 stores various programs and various information including an operating system (hereinafter referred to as "OS") 21 and an external function program 22. The external function program 22 is an example of a program. The memory 12 is also used as a work area when various processes are executed. A buffer included in the CPU 11 is also an example of the memory.

An example of the memory 12 is not limited to a ROM, a RAM, an HDD, and so on, built in the MFP 1, and may be a storage medium that is read and written by the CPU 11. A computer-readable storage medium is a non-transitory medium. In addition to the above examples, the non-transitory medium also includes recording media such as a CD-ROM and a DVD-ROM. The non-transitory medium is also a tangible medium. On the other hand, an electric signal that carries a program downloaded from a server and so on, on the Internet is a computer-readable signal medium which is a kind of a computer-readable medium, but is not included in a non-transitory computer-readable storage medium.

The external function program 22 is a program that acquires instruction data from an external device such as the server 3 and realizes the function by processes based on the acquired instruction data. In the external function program 22, function URLs 221 and 222 for each additional function may be registered (stored), and the function URLs 221 and 222 are registered in advance by the designer of the image processing system 100 and so on. The function URLs 221 and 222 are information including access information indicating the transmission source of instruction data that starts execution of each additional function. The details of the external function program 22 will be described later.

The user interface 13 is a touch panel, for example. The user interface 13 includes hardware for displaying a screen for notifying the user of information and hardware for accepting operations by the user. The user interface 13 may be a set of a display and a button, a key, and so on.

The communication interface 14 includes a configuration that is connectable to the network 200 and the network 300. The communication interface 14 includes hardware for communicating with the server 3 via the network 200 and hardware for communicating with the storage 4 via the network 300. The communication standard of the communication interface 14 may be Ethernet, Wi-Fi, USB, and so on ("Wi-Fi" is a registered trademark of the Wi-Fi Alliance). The MFP 1 may include a plurality of communication interfaces 14 corresponding to a plurality of communication standards. The network 200 and the network 300 may be a local network connected to the MFP 1 or may be the Internet. Further, the network 200 and the network 300 may be the same network.

The print engine 15 includes a configuration for printing an image based on image data on a print medium such as a sheet. The image forming method of the print engine 15 may be, for example, an electrophotographic method or an inkjet method. The scanner 16 includes a configuration for scanning an image of a set document and generating image data. The scanner 16 may be provided with a document feeder.

As shown in FIG. 1, the server 3 stores one or more instruction data 31, 32, 33, and so on, and has a function of transmitting specified instruction data based on a transmission instruction from the MFP 1 and so on. The server 3 is an example of a transmission source of instruction data. Each instruction data stored in the server 3 is information configured to be analyzed by the external function program 22 of the MFP 1, and is, for example, an xml file prepared by the designer of the image processing system 100 and so on. The details of instruction data will be described later. The designer and so on of the image processing system 100 include, for example, a system administrator of a company that has introduced the MFP 1, a vendor of the image processing system 100 including the MFP 1, and a designer or a service person of a manufacturer or a dealer of the MFP 1.

As shown in FIG. 1, the storage 4 stores one or more content data, for example. The storage 4 has a function of handing over content data to the MFP 1 based on a request from the MFP 1. The content data is various image data and documents for printing, and instruction data that specifies a print parameter and a print layout, for example. The instruction data stored in the storage 4 is information configured to be analyzed by the external function program 22 of the MFP 1, like the instruction data stored in the server 3. The instruction data stored in the storage 4 is, for example, an xml file prepared by the designer of the image processing system 100 and so on. The storage 4 may be a part of the apparatus constituting the server 3.

Next, the procedure of an additional function process executed by the external function program 22 of the MFP 1 based on an instruction of the user who uses the image processing system 100 will be described with reference to the flowchart of FIG. 2. The additional function process is executed by the CPU 11 of the MFP 1 in response to accepting a user's instruction to execute the additional function registered in the MFP 1 via the user interface 13, for example.

The following process basically indicates the process of the CPU 11 according to the instruction described in a program. That is, the processes such as "determination", "extraction", "selection", "calculation", "decision", "identification", "acquisition", "reception", and "control" in the following description represent the processes by the CPU 11. The process by the CPU 11 also includes hardware control using an API of the OS. In this specification, the operation of each program will be described by omitting the description of the OS. That is, in the following description, the description that "a program B controls hardware C" may mean "a program B controls hardware C using the API of the OS". In addition, the process of the CPU 11 according to the instruction described in the program may be described in abbreviated wording. For example, it may be described as "the CPU 11 performs". Further, the process of the CPU 11 according to the instruction described in the program may be described by a wording that omits the CPU, such as "a program A performs".

Note that "acquisition" is used as a concept that does not require a request. That is, a process of receiving data without being requested by the CPU 11 is also included in the concept of "the CPU acquires data". The "data" in this specification is represented by a computer-readable bit string. Data having the same substantial meaning and different formats are treated as the same data. The same applies to "information" in this specification. Further, "request" and "instruct" are concepts indicating that information indicating that a request is being made or information indicating that an instruction is being given is outputted to the counterpart. Further, the information indicating that the request is being made or the information indicating that the instruction is being given is simply described as "request" or "instruction", respectively.

Further, the CPU 11's process of determining whether information A indicates matter B may be conceptually described as "determining from information A whether it is matter B". The CPU 11's process of determining whether information A indicates matter B or indicates matter C may be described conceptually as "determine from information A whether it is matter B or matter C".

By storing a plurality of instruction data in the server 3 and allowing the MFP 1 to access the server 3, the designer and so on of the image processing system 100 including the MFP 1 and the server 3 may design the MFP 1 to execute a series of processes combining various processes. The instruction data may include an instruction to acquire next instruction data. The designer and so on of the image processing system 100 stores, as the function URLs 221 and 222, in the MFP 1, information indicating the transmission source of instruction data that is first acquired by the MFP 1 when the MFP 1 executes a series of processes, in association with the name of the series of processes. The function URLs 221 and 222 are examples of access information registered in the MFP 1, and are access information indicating the transmission source of the initial instruction data corresponding to each additional function.

The MFP 1 may directly accept a registration instruction of a function URL via, for example, the user interface 13, or may accept the registration instruction via a personal computer and so on that is connectable to the MFP 1. The user may use a personal computer and so on to register various additional functions in the MFP 1 by using, for example, an Embedded Web Server provided in the MFP 1 or an application program dedicated to registration of function URLs. When registering an additional function, the MFP 1 stores the name of the additional function in association with the function URL indicating the first instruction data in the additional function.

In the additional function process, the CPU 11 controls the user interface 13 to display a list of names of the additional functions registered in the MFP 1 (S101), and accepts the user's selection (S102). The CPU 11 displays, for example, a list of names of additional functions associated with each function URL, and accepts selection of an additional function. The user of the image processing system 100 selects an additional function to be executed by the MFP 1 and instructs to execute the process. In response to determining that the user's selection is not accepted (S102: NO), the CPU 11 waits until a selection is accepted.

In response to determining that the user's selection and the execution instruction have been accepted (S102: YES), the CPU 11 reads the function URL corresponding to the selected additional function, accesses the server 3 based on the function URL, and acquires the instruction data indicated by the function URL from the server 3 (S103). The CPU 11 receives a particular xml file which is instruction data from the server 3. S103 is an example of a reception process. The process of accessing the server 3 using the function URL registered (stored) in the memory 12 is also a process of requesting the server 3 to transmit the instruction data. The CPU 11 analyzes the acquired instruction data and executes the process instructed by the instruction data (S111).

An example of the instruction data acquired in S103 and a procedure of the processes executed by the CPU 11 in S111 will be described. The MFP 1 of this embodiment executes an input-type process which is a process of acquiring content data, an output-type process which is a process of outputting the content data, and a processing-type process which is a process of processing (changing) the content data, as functions that are executable based on instruction data.

First, the input-type process and the output-type process will be described with reference to FIGS. 3A and 3B to FIGS. 6A and 6B. The first line and the last line of the instruction data shown in FIGS. 3A to 6A are information indicating the kind of a process and are kind tags. A kind tag is an example of kind information. The MFP 1 of this embodiment supports, for example, <Scan>, <Input>, <Print>, <Output>, and <Process> as kind tags. <Scan> and <Input> are kind tags indicating the input-type process and are examples of input process information. <Print> and <Output> are kind tags indicating the output-type process, and are examples of output process information. <Process> is a kind tag indicating the processing-type process, and is an example of processing information. The processing-type process will be described later. The tag names such as the kind tags supported by the external function program 22 are not limited to those exemplified in the present specification. A tag name appropriately designed by the designer of the image processing system 100 and so on is adopted.

The MFP 1 of this embodiment stores and reads intermediate content data as resource data in various processes. The input-type instruction data includes information that specifies an input method for acquiring content data and designation of identification information that is given to identify resource data to be stored. When the MFP 1 performs processes based on the input-type instruction data, the MFP 1 acquires the content data based on the specified input method, and stores content data in which the specified identification information is associated with the acquired content data in the memory 12 as resource data.

The output-type instruction data includes information that specifies an output method of the content data and designation of identification information that identifies the resource data to be read. When the MFP 1 performs a process based on the output-type instruction data, the MFP 1 reads the resource data associated with the specified identification information from the memory 12, and outputs the content data included in the resource data based on the specified output method. In the following, the resource data and the content data included in the resource data may be simply referred to as resource data, without distinguishing both data.

Next, the instruction data in each figure will be specifically described. The instruction data 51 shown in FIG. 3A is instruction data including a <Scan> tag, and is an example of the input-type instruction data instructing the MFP 1 to execute a scan. The instruction data 51 includes a kind tag 511 for specifying a scan, setting information 512 for specifying various scan settings, resource data identification information 513, and instruction data information 514 indicating the next instruction data. The kind tag 511 for specifying a scan is an example of information for specifying an input method, and is an example of scan instruction information. The identification information 513 is an example of resource identification information for identifying the resource data to be stored. The instruction data information 514 is an example of reception instruction information. In this embodiment, the name of the resource data is used as the identification information 513 and so on.

In a case where the instruction data acquired in S103 of the additional function process is instruction data including a <Scan> tag, for example, instruction data 51, the CPU 11 executes a scan process shown in FIG. 3B in S111. In the scan process, the CPU 11 creates resource data for storage in association with the identification information 513 (S201). Specifically, the CPU 11 creates a file with the identification information 513 as a file name, and opens the created file. In the following, resource data in a file format will also be referred to as a resource data file.

The CPU 11 acquires scan settings based on the setting information 512 (S202), controls the scanner 16 to read the image of the document with the acquired scan settings, and acquires content data for one page (S203). In this case, the content data is specifically image data for one page. The format of the image data is, for example, a JPEG format or a bitmap format. The CPU 11 writes the acquired content data in the file created in S201 (S204). S203 and S204 are examples of an input process. The storage target in this case is the image data acquired by scanning. The CPU 11 determines whether the next document exists (S205). In response to determining that the next document exists (S205: YES), the CPU 11 returns to S203 and further performs scanning. In response to determining that the next document does not exist (S205: NO), the CPU 11 closes the file and ends the scan process.

Figures 4A, 4B:
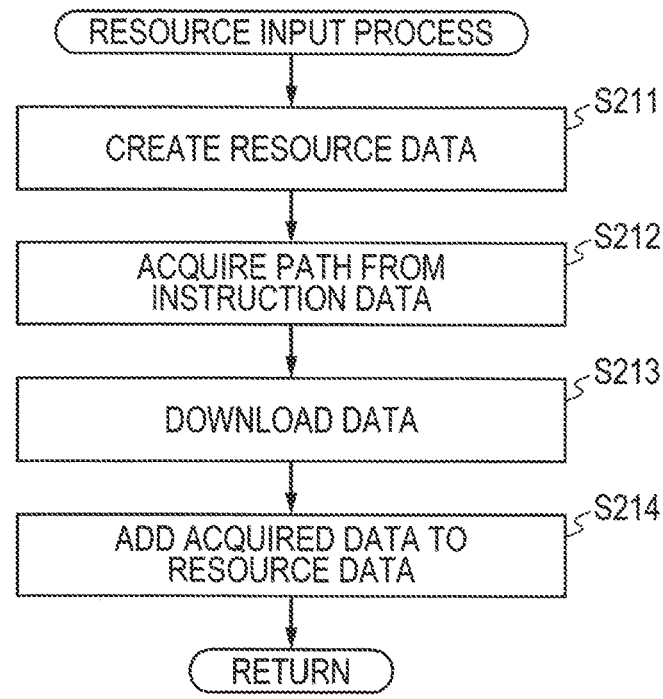
FIG. 4A is an explanatory diagram showing an example of instruction data for input.
FIG. 4B is a flowchart showing the procedure of a resource input process.

The instruction data 52 shown in FIG. 4A is instruction data including an <Input> tag, and is an example of the input-type instruction data for causing the MFP 1 to input content data. The instruction data 52 includes a kind tag 521 for specifying an input, path information 522 indicating a storage source of input target data, resource data identification information 523, and instruction data information 524 indicating the next instruction data. In the instruction data 52 of FIG. 4A, the path information 522 shows that the server "www.server-d.com" is the storage location of the input target data, and the input target data is a file with the file name of "maker loga.jpg". The instruction data 52 is an example of instruction data indicating an instruction for inputting content data by downloading. The kind tag 521 is an example of information for specifying an input method, and is an example of download instruction information indicating download. The path information 522 is an example of input source information indicating an input source. The identification information 523 is an example of resource identification information for identifying the resource data to be stored. The instruction data information 524 is an example of reception instruction information.

In a case where the instruction data acquired in S103 of the additional function process is instruction data including an <Input> tag, for example, the instruction data 52, the CPU 11 executes a resource input process shown in FIG. 4B in S111. In the resource input process, the CPU 11 creates resource data for storage in association with the identification information 523 (S211). The CPU 11 creates and opens a file in the same manner as S201. The CPU 11 acquires, based on the path information 522, the path of the content data to be inputted (S212), and inputs the content data using the acquired path (S213). The CPU 11 downloads, for example, the specified content data from the storage 4.

The CPU 11 writes the acquired content data to the resource data file created in S211 (S214), and ends the resource input process. S213 and S214 are examples of an input process. The storage target in the resource input process is not limited to image data. For the path information, for example, instruction data or text data used in a processing-type instruction data described later may be also specified. In the resource input process, even if the input target data is instruction data, the CPU 11 does not analyze or execute the instruction data. For example, an FTP server, a CIFS server, and an HTTP server may be used as the path information of the instruction data including an <Input> tag. As the path information, the designation of a USB memory mounted on the MFP 1 or a network storage connected to the MFP 1 may be accepted, and in that case, the MFP 1 reads content data from the specified USB memory or the network storage.

Figures 5A, 5B:
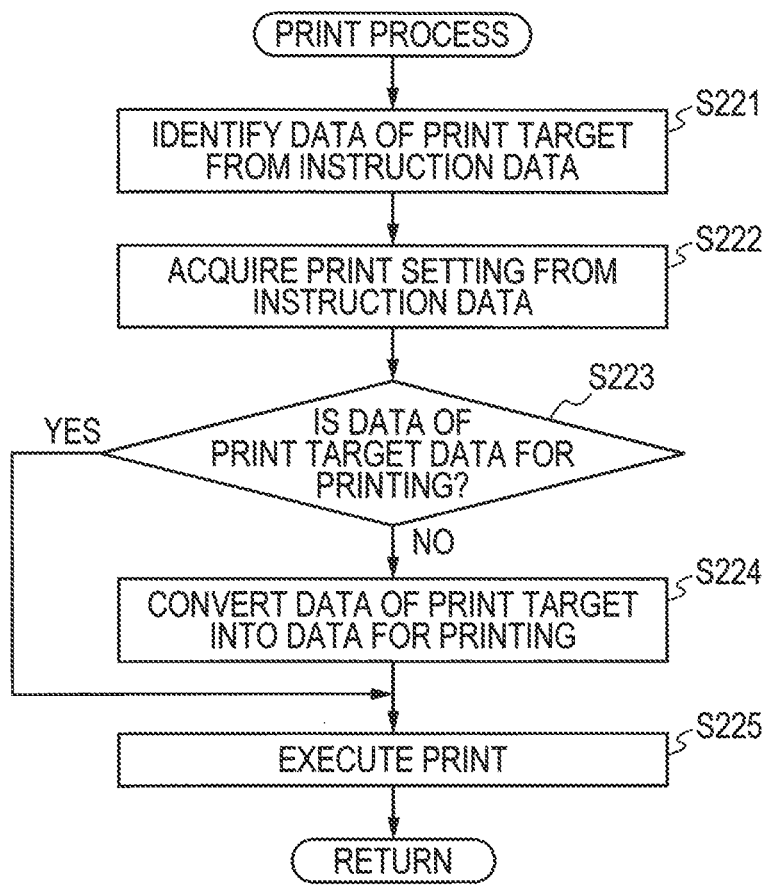
FIG. 5A is an explanatory diagram showing an example of instruction data of a print instruction.
FIG. 5B is a flowchart showing the procedure of a print process.

The instruction data 53 shown in FIG. 5A is instruction data including a <Print> tag, and is an example of output-type instruction data for causing the MFP 1 to execute printing. The instruction data 53 includes a kind tag 531 for specifying printing, setting information 532 for specifying various print settings, resource data identification information 533, and instruction data information 534 indicating the next instruction data. The kind tag 531 that specifies printing is an example of information that specifies an output method. The identification information 533 is an example of resource identification information for identifying the resource data to be read. The instruction data information 534 is an example of reception instruction information.

In a case where the instruction data acquired in S103 of the additional function process is instruction data including a <Print> tag, for example, the instruction data 53, the CPU 11 executes a print process shown in FIG. 5B in S111. In the print process, the CPU 11 identifies the resource data file stored in association with the identification information 533 based on the instruction data 53, opens the identified resource data file, and reads the resource data (S221). The CPU 11 acquires print settings based on the setting information 532 (S222).

The CPU 11 analyzes the resource data read in S221 and determines whether the resource data is print data (that is, data for printing) (S223). In response to determining that the data is not print data (S223: NO), the CPU 11 converts the resource data into print data (S224). Specifically, when the resource data is data of a print job format created by the printer driver and so on, the CPU 11 determines in S223 that it is not print data. If the resource data is data of the print job format, in S224 the CPU 11 rasterizes the resource data to convert the same into print data which is image data in a raster format. When the resource data is data obtained by rasterizing data of the print job format, the CPU 11 determines in S223 that the data is print data.

After S224, or in response to determining that the data is print data (S223: YES), the CPU 11 instructs the print engine 15 to perform printing (S225), and ends the print process. S225 is an example of an output process. The print data is an example of image data of an output target. In S223, the CPU 11 may determine that the resource data is print data if the resource data is image data of a raster format such as bitmap or JPEG, and may determine that the resource data is not print data if the resource data is data of a format, such as PDF or PS, other than the raster format. The CPU 11 may cause an external device such as a conversion server to perform the conversion of S224.

Figures 6A, 6B:
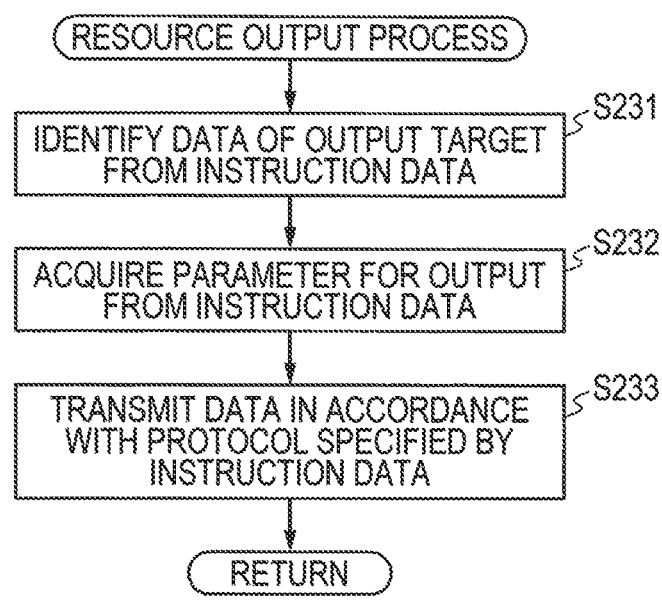
FIG. 6A is an explanatory diagram showing an example of instruction data for output.
FIG. 6B is a flowchart showing the procedure of a resource output process.

The instruction data 54 shown in FIG. 6A is instruction data including an <Output> tag, and is an example of the output-type instruction data for causing the MFP 1 to output data. The instruction data 54 includes a kind tag 541 for specifying an output, resource data identification information 542, and setting information 543 for specifying output destination information and an output protocol. The setting information 543 is an example of information that specifies an output method. The identification information 542 is an example of resource identification information for identifying the resource data to be read.

In a case where the instruction data acquired in S103 of the additional function process is instruction data including an <Output> tag, for example, the instruction data 54, the CPU 11 executes a resource output process shown in FIG. 6B in S111. In the resource output process, the CPU 11 identifies the resource data stored in association with the identification information 542 based on the instruction data 54 (S231).

The CPU 11 acquires output destination information and output parameters (S232) based on the setting information 543, and transmits resource data in accordance with the specified protocol (S233). S233 is an example of an output process. In this case, data of the output target is not necessarily image data. After transmitting all resource data, the CPU 11 ends the resource output process. In the setting information 543, for example, the file name of the file to be outputted may be specified as the output destination. In a case where the file name is specified, the CPU 11 outputs a file with the specified file name in S233.

In the instruction data including an <Output> tag, a data transmission destination may be specified as the data output destination. As the data transmission destination, for example, an FTP server, a CIFS server, an HTTP server, an email server, or a SharePoint server may be specified. If data transmission is specified, an appropriate protocol depending on the specified destination may be specified as the output parameter. As the data output destination, a USB memory mounted on the MFP 1 or a network storage connected to the MFP 1 may also be specified, and in that case, the MFP 1 writes the content data to the specified USB memory or the network storage.

The description of the additional function process of FIG. 2 will be continued. After executing various processes in S111 based on the instruction data acquired in S103, the CPU 11 determines whether instruction data of the execution target includes instruction data information indicating the next instruction data (S121). For example, if the instruction data acquired in S103 is any one of the instruction data 51 (FIG. 3A), the instruction data 52 (FIG. 4A), and the instruction data 53 (FIG. 5A), the instruction data includes the instruction data information 514, 524, 534. If the instruction data acquired in S103 is the instruction data 54 (FIG. 6A), the instruction data information is not included.

In response to determining that the instruction data information is included (S121: YES), the CPU 11 returns to S103 and acquires the next instruction data from the server 3 based on the instruction data information. S103 in this case is an example of a continuation process. The CPU 11 continuously executes various processes based on the acquired next instruction data. In response to determining that the instruction data of the execution target does not include the instruction data information (S121: NO), the CPU 11 deletes all resource data created by the additional function process (S122), and ends the additional function process. S122 is an example of a first deletion process.

In the MFP 1 of this embodiment, by combining the input-type instruction data and the output-type instruction data, an additional function of outputting one inputted data to a plurality of output destinations, for example. For example, an additional function may be created and registered in which the instruction data information 514 of the instruction data 51 is information indicating the instruction data 53 as the next instruction data, and the instruction data information 534 of the instruction data 53 is information indicating the instruction data 54 as the next instruction data. When the additional function created in this way is executed, for example, both printing and uploading are executed by using one scan data acquired by scan as the resource data.

The MFP 1 of this embodiment also supports the processing-type instruction data that performs processing of resource data. For example, as described above, when printing and uploading are performed based on one scan data, the scan data may be data of a format unsuitable for uploading. The MFP 1 of this embodiment accepts, for example, a conversion instruction of the data format of a resource data file as the processing-type instruction data. By adding the processing-type instruction data, a series of additional functions is designed such that the content data acquired by the input-type instruction data is processed by the processing-type instruction data, and the content data after processing is outputted by the output-type instruction data.

Next, the processing-type process will be described with reference to FIGS. 7A and 7B to FIG. 12. The processing-type instruction data is instruction data including a <Process> tag as a kind tag. In addition to the kind tag, the processing-type instruction data includes information indicating a processing method. The MFP 1 of this embodiment supports conversion, composition, and replacement as a processing method. Conversion is processing of generating content data in which the format of the original content data is changed. Composition is processing of combining a plurality of content data to generate one content data. Replacement is processing of generating content data in which reserved words in content data preset in the MFP 1 are replaced with the corresponding text.

The processing-type instruction data includes a designation of first identification information that identifies the resource data to be read, information that specifies the processing method of the content data, and a designation of second identification information that identifies the resource data to be stored. When processes are performed based on the processing-type instruction data, the MFP 1 reads the resource data associated with the first identification information from the memory 12, processes the content data included in the resource data by the specified processing method, and stores, as resource data, the content data in which the second identification information is associated with the content data after processing in the memory 12.

The instruction data 55 shown in FIG. 7A is the processing-type instruction data and is an example of instruction data whose processing method is conversion. The instruction data 55 includes a kind tag 551 indicating processing, method information 552 indicating a processing method, identification information 553 indicating resource data before processing, identification information 554 indicating resource data after processing, format information 555 indicating the file format of the resource data after processing, and instruction data information 556 indicating the next instruction data. The method information 552 is an example of conversion instruction information. The identification information 553 is an example of first resource identification information, and the identification information 554 is an example of second resource identification information. The content data of the resource data before processing is data that is acquired by the MFP 1 by the input-type instruction data executed before the instruction data 55, and is stored as a file.

In a case where the instruction data acquired in S103 of the additional function process is the processing-type instruction data instructing to perform conversion, for example, the instruction data 55, the CPU 11 executes a conversion process shown in FIG. 7B in S111. In the conversion process, the CPU 11 creates resource data for storage in association with the identification information 554 (S241). Specifically, the CPU 11 creates a file with the identification information 554 as a file name, and opens the created file. The CPU 11 identifies the resource data file before processing that is stored in association with the identification information 553, opens the identified file, and reads the resource data (S242).

The CPU 11 converts the content data of the resource data read in S242 into the format shown in the format information 555 (S243), writes the same in the resource data file created in S241 (S244), and ends the conversion process. Specifically, the CPU 11 creates temporary data in which the format of the read resource data has been converted, and writes the temporary data in the resource data file for storage. For example, the MFP 1 converts the content data of the resource data before processing, into a PDF format file by executing the conversion process based on the instruction data 55, assigns the identification information 554 thereto, and stores the content data. The CPU 11 may delete the resource data file before processing.

The instruction data 56 and 57 shown in FIGS. 8A and 8B are the processing-type instruction data, and are examples of instruction data whose processing method is composition. In the composition instruction data, a plurality of image data of a composition target or layout information may be used as resource data before processing. The layout information is information for specifying the layout for arranging a plurality of image data. The layout information includes information indicating a plurality of image data of the composition target and arrangement information (including page, coordinates, size, angle, transparency) of each image data. In any case, the resource data before processing specified by the composition instruction data is data acquired by the MFP 1 and stored in the memory 12 based on the input-type instruction data executed before the execution of the composition instruction data.

In a case where the resource data before processing is a plurality of image data of the composition target, the MFP 1 performs composition according to a particular method such as a "2 in 1" (2 images on 1 page) arrangement or a simple superposition composition in processes according to the composition instruction data. In a case where the resource data before processing is layout information, the MFP 1 performs the composition process based on the description of the layout information in the processes according to the composition instruction data.

The instruction data 56 in FIG. 8A is an example in which a plurality of image data of the composition target is specified as resource data before processing. The instruction data 56 in FIG. 8A includes a kind tag 561 indicating processing, method information 562 indicating a processing method, identification information 563 indicating resource data before processing, identification information 564 indicating the resource data after processing, format information 565 indicating a file format of resource data after processing, and instruction data information 566 indicating the next instruction data. The method information 562 is an example of composition instruction information. The identification information 563 is an example of the first resource identification information, and the identification information 564 is an example of the second resource identification information.

In a case where the instruction data acquired in S103 of the additional function process is the instruction data 56 instructing to perform composition, the CPU 11 generates one content data obtained by combining a plurality of read content data according to a predetermined method in S111 and stores the generated content data as resource data. In this case, it can be said that the method information 562 is a layout instruction.

The instruction data 57 in FIG. 8B is an example in which layout information indicating the layout of composition is specified as resource data before processing. The instruction data 57 of FIG. 8B includes a kind tag 571 indicating processing, method information 572 indicating a processing method, and identification information 573 indicating resource data before processing. The identification information 573 is identification information indicating layout information stored as resource data in the memory 12 by the resource input process executed in advance. The instruction data 57 includes identification information 574 indicating the resource data after processing, format information 575 indicating the file format of the resource data after processing, and instruction data information 576 indicating the next instruction data. The method information 572 is an example of composition instruction information. The identification information 573 is an example of the first resource identification information, and the identification information 574 is an example of the second resource identification information.

The layout information indicated by the identification information 573 is, for example, the resource data inputted by the MFP 1 by the processes according to instruction data 52L shown in FIG. 9A and stored in the memory 12. By executing the input-type instruction data 52L, the MFP 1 acquires layout information from the server 3, and stores, as resource data, the layout information in association with the same identification information as the identification information 573.

An example of layout information is shown in FIG. 9B. The layout information 58 shown in FIG. 9B is instruction data including a layout instruction. The layout information 58 is an example of a layout for one page, and includes page information 581 indicating the size and orientation of the page and a plurality of resource information 582 and 583 indicating the identification information and arrangement of the resource data to be laid out on the page. The resource information 582 and 583 are examples of resource identification information for identifying resource data of the layout target. The layout information 58 may include an instruction to arrange a fixed text or image at a particular position in addition to the information of the resource data.

Figure 10:
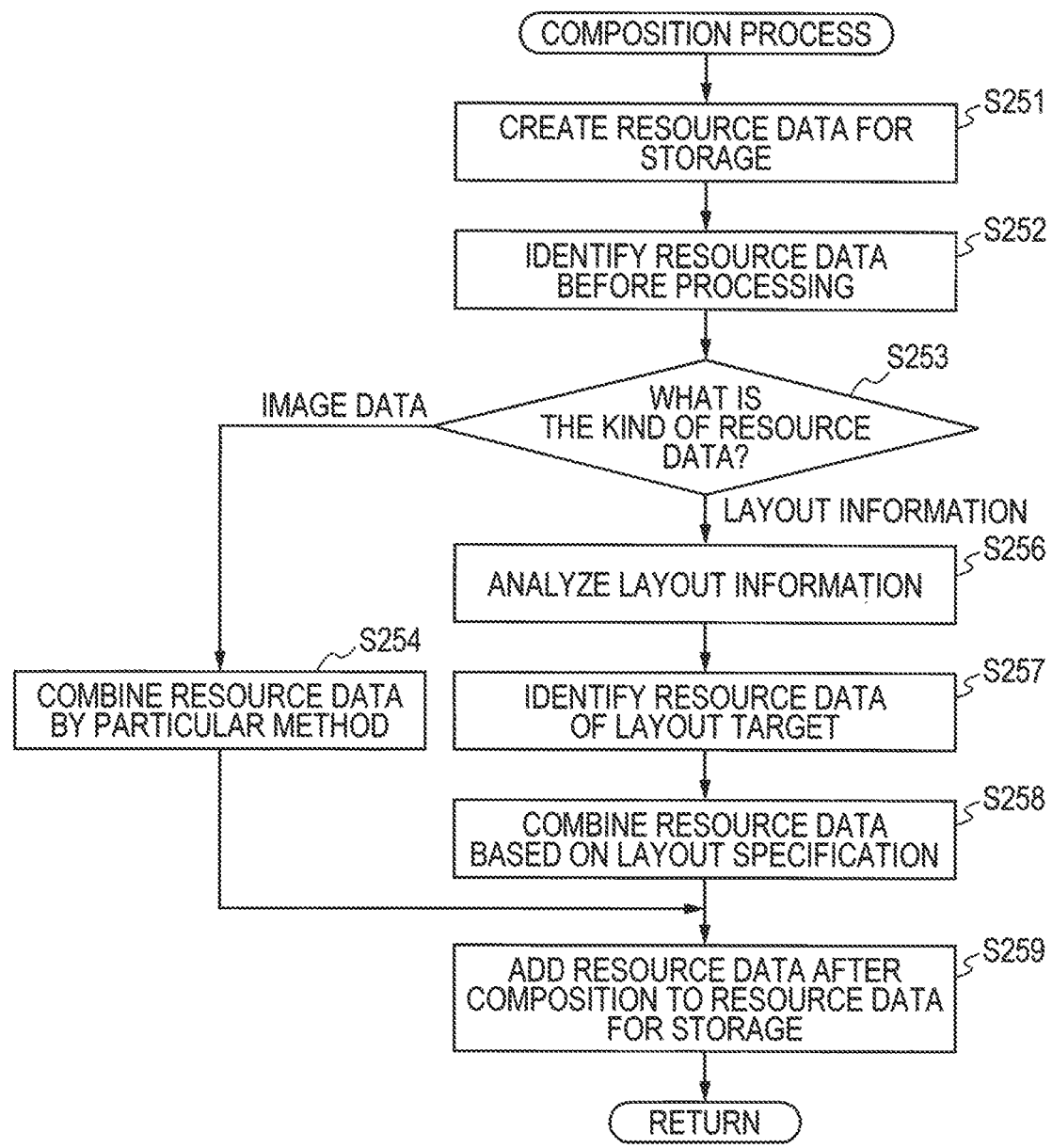
FIG. 10 is a flowchart showing the procedure of a composition process.

In a case where the instruction data acquired in S103 of the additional function process is the processing-type instruction data instructing to perform composition, for example, the instruction data 56 or the instruction data 57, the CPU 11 executes a composition process shown in FIG. 10 in S111. In the composition process, the CPU 11 creates and opens a resource data file for storage in association with the identification information 564 or the identification information 574 (S251). The CPU 11 identifies the resource data file before processing stored in association with the identification information 563 or the identification information 573, opens the identified file, and reads the resource data (S252). The CPU 11 determines the kind of the read resource data (S253).

In response to determining that the kind of the identified resource data is image data (S253: image data), the CPU 11 combines the resource data identified in S252 according to a particular method and creates temporary data after composition (S254). The MFP 1 performs composition by a predetermined method such as a "2 in 1" arrangement or a simple superposition composition.

In response to determining that the kind of the read resource data is the layout information as shown in FIG. 9B (S253: layout information), the CPU 11 analyzes the layout information (S256). For example, the CPU 11 identifies the resource data file before processing based on the resource information 582 and 583 of the layout information 58, opens the identified files, and reads a plurality of image data which are resource data (S257). Based on the designation in the layout information 58, the CPU 11 generates image data in which the images indicated by the plurality of read image data are arranged, as temporary data after composition (S258). After S254 or S258, the CPU 11 writes the temporary data after composition to the resource data file created in S251 (S259), and ends the composition process.

For example, the layout information may be written in the composition instruction data, or may be instruction data stored in advance in the memory 12 of the MFP 1, instead of being prepared as resource data inputted from the server 3 and so on by the input-type instruction data.

In the instruction data 56 and 57 instructing to perform composition, the file format of the resource data after processing is specified as the format information 565 and 575. In a case where the specified format information is the PDF format, the CPU 11 creates a resource data file in the PDF format in S251 of the composition process. The PDF format file has a structure including, for each page, a plurality of image data and arrangement information indicating the arrangement of images indicated by each image data.

When a plurality of image data are combined and the image data after composition is outputted in the PDF format, the MFP 1 may rewrite the arrangement information indicating the layout, without performing image processing such as rasterization of the image data or processing of the rasterized image data. In the example of the instruction data 57, the MFP 1 combines a plurality of image data and arrangement information rewritten based on the layout information 58 in the format defined by the PDF format, thereby generating a resource data file of the arrangement according to the instruction. The PDF format is an example of a particular image format. By generating a PDF format file as content data of the output target, composition is performed by a simple process, which is an easy-to-use additional function.

The resource data before processing specified by the processing-type instruction data instructing to perform composition may be a combination of layout information and image data of the composition target. In that case, the MFP 1 reads the image data of the composition target from the specified resource data file and executes the composition according to the description of the layout information.

The instruction data 59 shown in FIG. 11A is the processing-type instruction data and is an example of the instruction data whose processing method is replacement. Replacement is a process of generating text data in which reserved words included in the text data are replaced with the corresponding text. The resource data before processing specified by the replacement instruction data includes text data including reserved words such as a profile 60 before replacement shown in FIG. 11B, and the resource data after processing includes text data after replacement such as a profile 61 after replacement shown in FIG. 11C. The resource data before processing specified by the replacement instruction data is the data acquired by the MFP 1 and stored in the memory 12 based on the input-type instruction data executed before the execution of the replacement instruction data.

The instruction data 59 shown in FIG. 11A includes a kind tag 591 indicating processing, method information 592 indicating a processing method, identification information 593 indicating resource data before processing, identification information 594 indicating resource data after processing, format information 595 indicating the file format of the resource data after processing, and instruction data information 596 indicating the next instruction data. The method information 592 is an example of replacement instruction information. The identification information 593 is an example of the first resource identification information, and the identification information 594 is an example of the second resource identification information.

The resource data before processing associated with the identification information 593 is, for example, the profile 60 before replacement shown in FIG. 11B, and is text data including reserved words represented by a character string surrounded by "%%". In a case where the resource data before processing is a file containing text data including reserved words and the process based on the instruction data whose processing method is replacement is executed, the MFP 1 generates text data in which the reserved words have been replaced with the corresponding text according to a predetermined definition and writes the same to the resource data file after processing. The reserved words are an example of reserved information.

The reserved words are registered in the MFP 1 in advance, and the MFP 1 acquires the corresponding information from, for example, the OS 21. The reserved words include, for example, the user name of the user logged in to the MFP 1, the current date and time when this process is executed, the serial number of the MFP 1, and the IP address of the MFP 1. Some reserved words may be replaced with setting information related to a process already executed by MFP 1. Reserved words related to a process include, for example, words about scanning, such as color or monochrome, scan resolution, number of pages for scanning, and includes words regarding printing, such as color or monochrome, print resolution, number of pages for printing. In response to receiving an instruction of replacement of resource data including reserved words related to a process, the MFP 1 replaces each reserved word based on the setting information used in the process already executed by the additional function that is being executed or used in the latest process.

Figure 12:
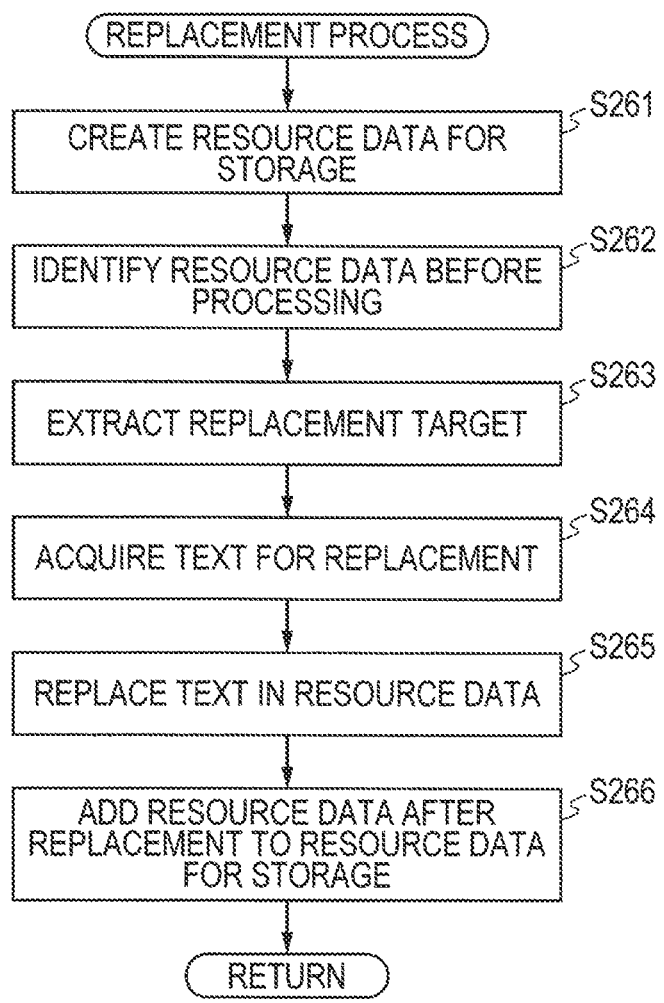
FIG. 12 is a flowchart showing the procedure of a replacement process.

In a case where the instruction data acquired in S103 of the additional function process is the processing-type instruction data instructing to perform the replacement, for example, the instruction data 59, the CPU 11 executes a replacement process shown in FIG. 12 in S111. In the replacement process, the CPU 11 creates a resource data file for storage in association with the identification information 594, and opens the created file (S261). The CPU 11 identifies the resource data file before processing stored in association with the identification information 593, opens the identified file, and reads the resource data (S262). The resource data before processing includes, for example, text data including reserved words such as the profile 60 before replacement shown in FIG. 11B. The CPU 11 extracts reserved words of the replacement target from the text data before the replacement (S263), and acquires the replacement text corresponding to each reserved word based on, for example, the information of the OS 21 (S264).

The CPU 11 replaces the reserved words in the text data before replacement with the text for replacement, creates temporary data after replacement (S265), writes the temporary data to the resource data file for storage (S266), and ends the replacement process. In a case where the text data before replacement is the profile 60 before replacement shown in FIG. 11B, the CPU 11 creates, for example, the profile 61 after replacement shown in FIG. 11C as the text data after replacement.

Next, as additional functions that are executable by the MFP 1 by combining various instruction data, four examples of first to fourth additional functions will be described with reference to the sequence charts.

Figure 13:
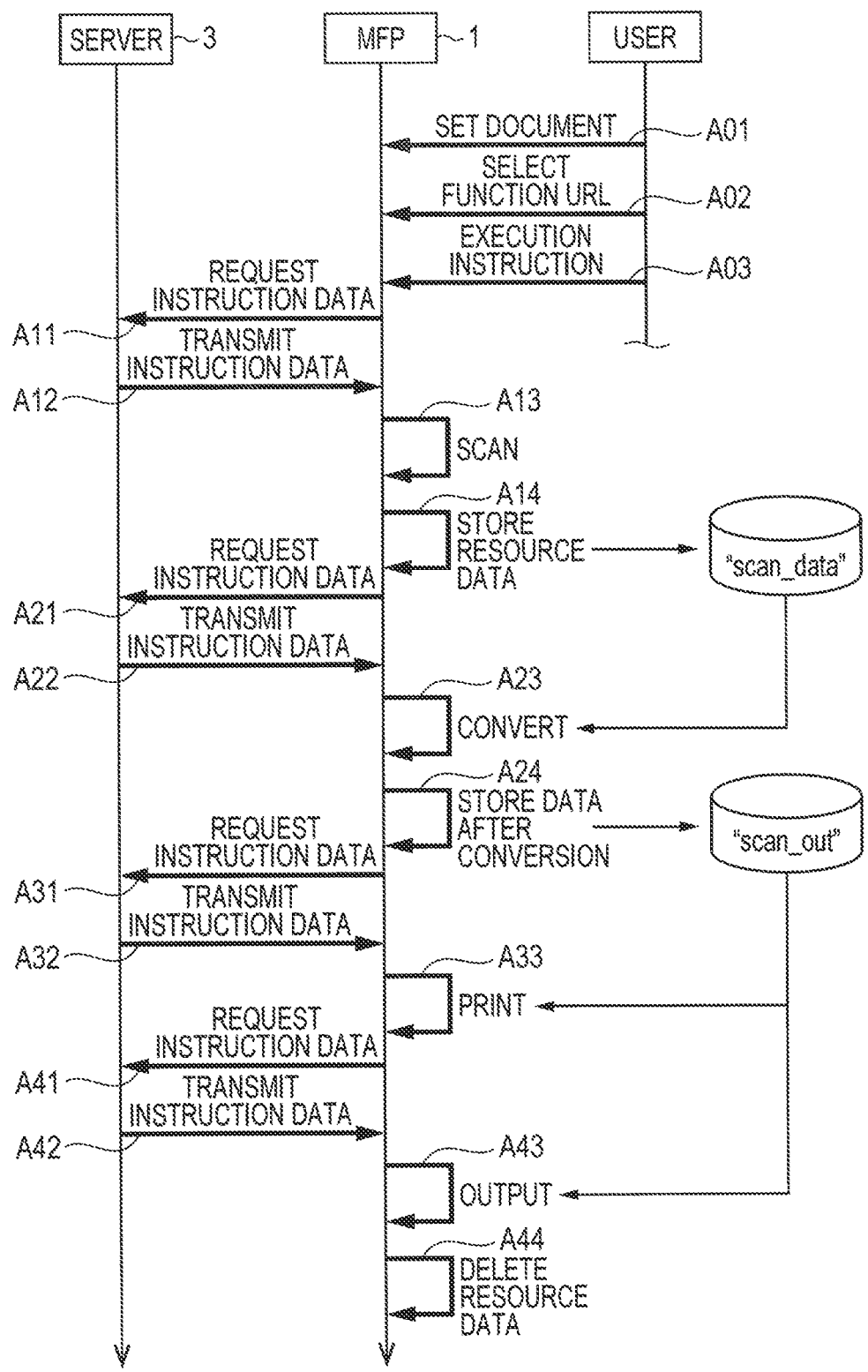
FIG. 13 is a sequence chart showing the procedure of a first additional function.

First, the first additional function will be described with reference to FIG. 13. The first additional function is an additional function that combines scanning, conversion, and two kinds of output. When executing the first additional function, the user sets a document in the MFP 1 (A01), selects a function URL indicating the first additional function (A02), and gives an instruction for the execution (A03, S102 in FIG. 2).

The MFP 1 requests the server 3 to transmit the instruction data based on the instructed function URL (A11). In the first additional function, the instruction data corresponding to the function URL is the input-type instruction data instructing to perform scanning, and is, for example, the instruction data 51 shown in FIG. 3A. The server 3 transmits the instruction data 51 based on the request of the MFP 1 (A12, S103 in FIG. 2). The MFP 1 executes a scan process based on the received instruction data 51 (A13, FIG. 3B), and stores the scan result as a resource data file (A14).

The MFP 1 requests the server 3 to transmit the next instruction data based on the instruction data 51 (A21). Information indicating the instruction data 55 shown in FIG. 7A is set in the instruction data information 514 of the instruction data 51. The server 3 transmits the instruction data 55 based on the request of the MFP 1 (A22, S103 in FIG. 2). The MFP 1 executes a conversion process based on the received instruction data 55 (A23, FIG. 7B), and stores the resource data file after conversion (A24). The identification information 553 of the instruction data 55 is the same as the identification information 513 of the instruction data 51, and the MFP 1 converts the resource data file stored in A14 into a file of the PDF format.

The MFP 1 requests the server 3 to transmit the next instruction data based on the instruction data 55 (A31). Information indicating the instruction data 53 shown in FIG. 5A is set in the instruction data information 556 of the instruction data 55. The server 3 transmits the instruction data 53 based on the request of the MFP 1 (A32, S103 in FIG. 2). The MFP 1 executes a print process based on the received instruction data 53 (A33, FIG. 5B). The identification information 533 of the instruction data 53 is the same as the identification information 554 of the instruction data 55, and the MFP 1 prints an image based on the resource data file after conversion stored in A24.

The MFP 1 requests the server 3 to transmit the next instruction data based on the instruction data 53 (A41). Information indicating the instruction data 54 shown in FIG. 6A is set in the instruction data information 534 of the instruction data 53. The server 3 transmits the instruction data 54 based on the request of the MFP 1 (A42, S103 in FIG. 2). The MFP 1 executes the resource output process based on the received instruction data (A43, FIG. 6B). The identification information 542 of the instruction data 54 is the same as the identification information 554 of the instruction data 55, and the MFP 1 transmits the image data of the resource data file after conversion stored in A24.

The instruction data 54 does not include instruction data information. The MFP 1 deletes all the resource data files created by the first additional function (A44, S122 in FIG.

2), and ends the process of the first additional function. In A44, the MFP 1 deletes, for example, the resource data file stored in A14 associated with the identification information 513 and the resource data file stored in A24 associated with the identification information 554.

In the first additional function, one of the kind tag 531 that specifies printing of the instruction data 53 and the kind tag 541 that specifies the output of the instruction data 54 is an example of the first output instruction information, and the other is an example of the second output instruction information. In the first additional function, the execution order of printing and data transmission may be reversed, and the instruction data information 556 and the instruction data information 534 may be reversed. In a case where it is possible for the MFP 1 to print scan data as it is, the identification information 533 of the instruction data 53 may be the same as the identification information 513 of the instruction data 51, that is, the resource data used for the print process may be scan data. In the MFP 1 of this embodiment, similarly to the first additional function, it is possible to design an additional function of transmitting the scan result to two or more locations instead of printing, and an additional function of performing printing and transmission to two or more locations.

Figure 14:
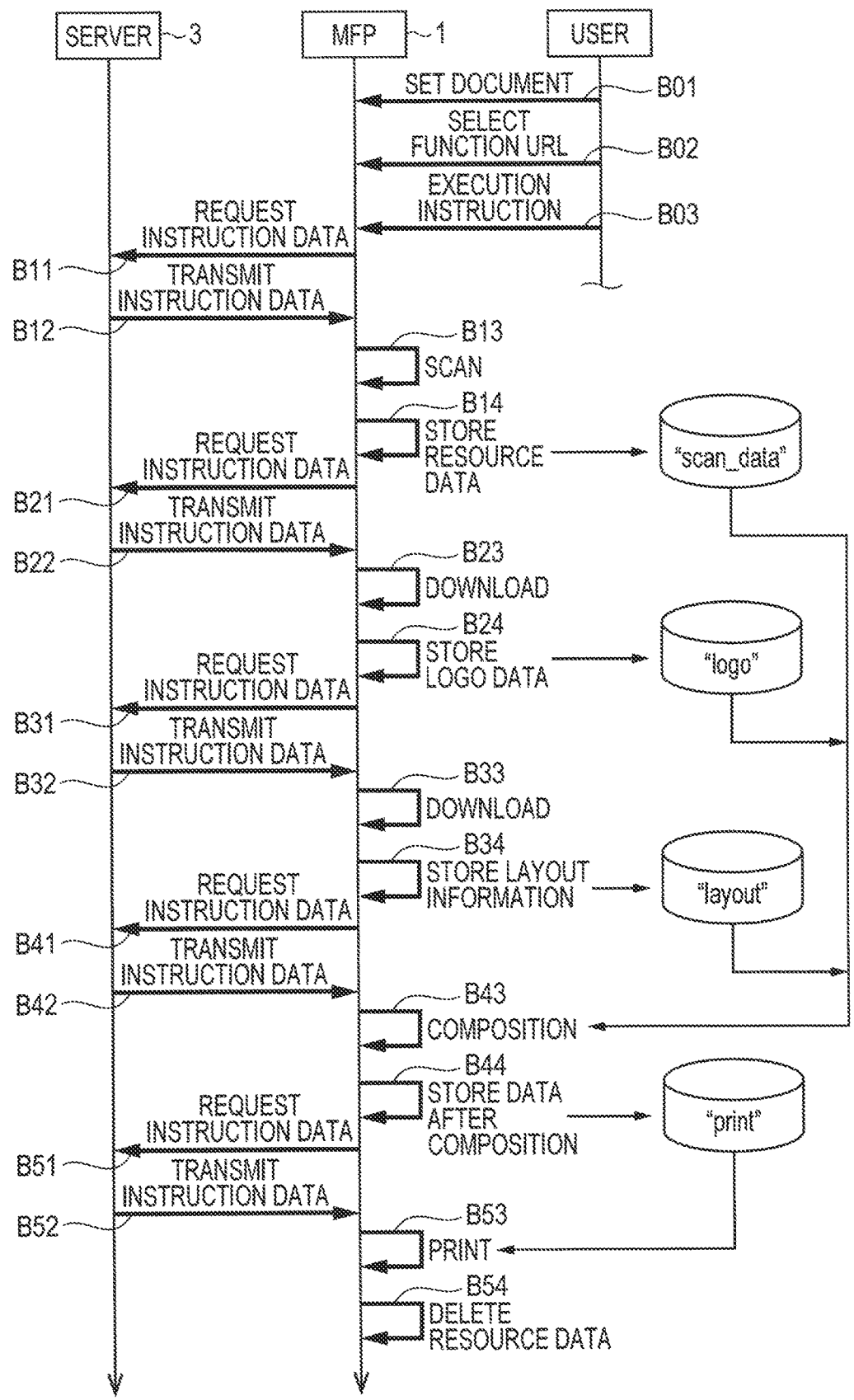
FIG. 14 is a sequence chart showing the procedure of a second additional function.

Next, the second additional function will be described with reference to FIG. 14. In the following, description of procedures that are the same as in the first additional function will be simplified. The second additional function is an additional function that combines scanning, composition, and printing. When executing the second additional function, the user sets a document in the MFP 1 (B01), selects a function URL indicating the second additional function (B02), and gives an instruction for the execution (B03, S102 in FIG. 2).

The MFP 1 requests the server 3 to transmit the instruction data based on the instructed function URL (B11), and receives the instruction data from the server 3 (B12). In the second additional function, the instruction data corresponding to the function URL is the input-type instruction data instructing to perform scanning, similarly to the instruction data 51 shown in FIG. 3A. The MFP 1 executes a scan process based on the received instruction data (B13), and stores the scan result as a resource data file (B14).

The MFP 1 requests the server 3 to transmit the next instruction data (B21), and receives the instruction data from the server 3 (B22). The instruction data received in B22 is the input-type instruction data similarly to the instruction data 52 shown in FIG. 4A. The MFP 1 executes a resource input process based on the received instruction data (B23), and stores the downloaded image data as a resource data file (B24). In B24, the MFP 1 stores, for example, image data indicating a logo.

The MFP 1 requests the server 3 to transmit the next instruction data (B31), and receives the instruction data from the server 3 (B32). The instruction data received in B32 is the input-type instruction data. The MFP 1 executes a resource input process based on the received instruction data (B33), and stores the downloaded layout information as a resource data file (B34). In the layout information stored in B34, the resource data file stored in B14 and the resource data file stored in B24 are specified as resource data before processing.

The MFP 1 requests the server 3 to transmit the next instruction data (B41), and receives the instruction data from the server 3 (B42). The instruction data received in B42 is, for example, processing-type instruction data instructing to perform composition using the layout information, similar to the instruction data 57 shown in FIG. 8B. The MFP 1 executes the composition process (B43) based on the layout information stored in B34, and stores the resource data file after composition (B44). In B44, the MFP 1 stores, for example, a file containing image data in which the logo acquired in B23 is superposed at a particular position on the scan result in B13.

The MFP 1 requests the server 3 to transmit the next instruction data (B51), and receives the instruction data from the server 3 (B52). The instruction data received in B52 is, for example, the output-type instruction data instructing to perform printing, similar to the instruction data 53 shown in FIG. 5A. The MFP 1 executes printing based on the resource data file stored in B44 (B53). The instruction data received in B52 does not include the instruction data information. The MFP 1 deletes all the resource data files created by the second additional function (B54, S122 in FIG. 2), and ends the process of the second additional function. In B54, the MFP 1 deletes all the resource data files stored in, for example, B14, B24, B34, and B44.

In the second additional function, the MFP 1 stores each resource data file corresponding to the resource information 582 and 583 of the layout information 58 and the layout information 58 by the input-type instruction data received before the composition instruction data. The set of the instruction data 51 received in B12 and the instruction data 52 received in B22 for storing each resource data file is an example of a set of first input instruction data and second input instruction data. The set of the kind tag 511 of the instruction data 51 and the kind tag 521 of the instruction data 52 is an example of a set of first input instruction information and second input instruction information. The input-type instruction data for storing the layout information 58 is an example of third input instruction data. The execution order of the three input-type instruction data may be any order.

After storing each resource data file according to the three input-type instruction data, the MFP 1 receives the instruction data instructing to perform the composition process and combines the image data included in the resource data files based on the layout information 58. As the composition process, the MFP 1 generates a resource data file in which a plurality of image data is arranged according to the layout instructed in the layout information 58, and stores the generated resource data file in association with the identification information specified in the composition instruction data. Each resource data file stored in B14 and B24 is an example of a set of first resource data and second resource data. The layout information 58 is an example of layout content data. The resource data file in which the layout information 58 is stored in association with the identification information is an example of layout resource data. By preparing the layout instruction as the layout information 58 and receiving the layout information 58 by the input-type instruction data, it is not necessary to prepare the layout information 58 in the MFP 1 in advance, and a common layout is applicable to a plurality of MFPs and so on.

In the second additional function, if the instruction data received in B52 is changed to an output-type instruction data other than printing, an additional function is created for outputting the content data in which the image data included in the two resource data files are arranged according to the layout information 58.

Figure 15:
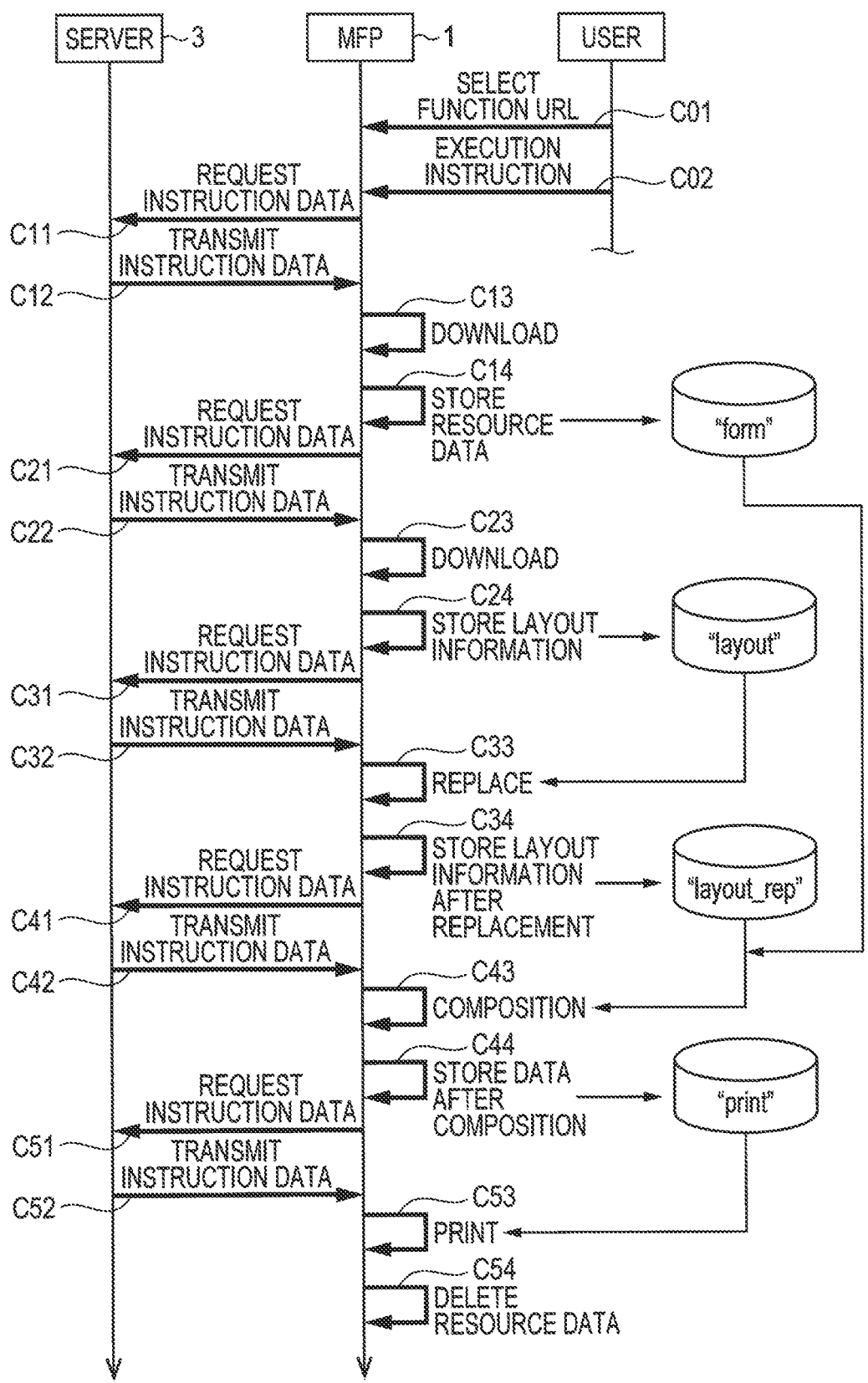
FIG. 15 is a sequence chart showing the procedure of a third additional function.

Next, the third additional function will be described with reference to FIG. 15. The third additional function is an additional function that combines input, replacement, and composition. When executing the third additional function, the user selects a function URL indicating the third additional function (C01) and gives an instruction for the execution (C02, S102 in FIG. 2).

The MFP 1 requests the server 3 to transmit the instruction data based on the instructed function URL (C11), and receives the instruction data from the server 3 (C12). In the third additional function, the instruction data corresponding to the function URL is the input-type instruction data. The MFP 1 executes the resource input process based on the received instruction data (C13) and stores the inputted data (downloaded data) as a resource data file (C14). In C14, the MFP 1 stores, for example, image data indicating a particular form.

Figure 16:
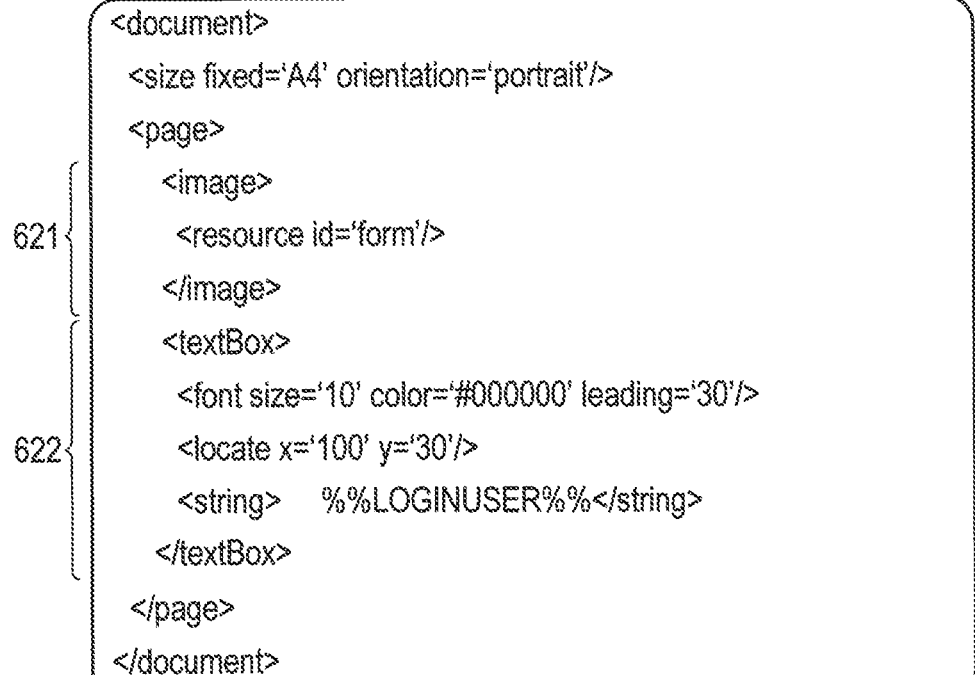
FIG. 16 is an explanatory diagram showing an example of layout information including a reserved word.

The MFP 1 requests the server 3 to transmit the next instruction data (C21), and receives the instruction data from the server 3 (C22). The instruction data received in C22 is the input-type instruction data. The MFP 1 executes downloading as a resource input process (C23) based on the received instruction data, and stores the downloaded data as a resource data file (C24). The resource data file stored in C24 is, for example, layout information 62 including resource information 621 and 622, as shown in FIG. 16. The resource information 621 is information indicating a resource data file stored in C14, and the resource information 622 is information indicating a text box including a reserved word. The reserved word included in the resource information 622 is, for example, information indicating the user name of the user currently logged in. The layout information 62 is an example of layout content data, and the resource information 622 is an example of text content data.

The MFP 1 requests the server 3 to transmit the next instruction data (C31), and receives the instruction data from the server 3 (C32). The instruction data received in C32 is the processing-type instruction data indicating replacement. Based on the received instruction data, the MFP 1 replaces the reserved word of the layout information stored in C24 with text (C33), and stores the layout information after replacement (C34).

The MFP 1 requests the server 3 to transmit the next instruction data (C41), and receives the instruction data from the server 3 (C42). The instruction data received in C42 is the processing-type instruction data instructing to perform composition. Based on the received instruction data, the MFP 1 combines the text box after replacement included in the layout information stored in C34 and the image data stored in C14, and stores the resource data file after composition (C44).

The MFP 1 requests the server 3 to transmit the next instruction data (C51), and receives the instruction data from the server 3 (C52). The instruction data received in C52 is the output-type instruction data instructing to perform printing. Based on the received instruction data, the MFP 1 executes printing based on the resource data file stored in C44 (C53). The instruction data received in C52 does not include the instruction data information. The MFP 1 deletes all the resource data files created by the third additional function (C54, S122 in FIG. 2), and ends the process of the third additional function. In C54, the MFP 1 deletes all the resource data files stored in, for example, C14, C24, C34, and C44.

In the third additional function, the MFP 1 prints an image in which the login user name is superposed on the downloaded image data by performing replacement and composition using the layout information 62 incorporating the reserved word. In the third additional function, the input-type instruction data received in C12 is an example of the first input instruction data, and the input-type instruction data received in C22 is an example of the second input instruction data. The replacement instruction data received in C32 and the composition instruction data received in C42 are examples of processing instruction data, and the print instruction data received in C52 is an example of output instruction data. The output of the resource data after processing is not limited to printing, but may be transmission, or may be both printing and transmission.

Figure 17:
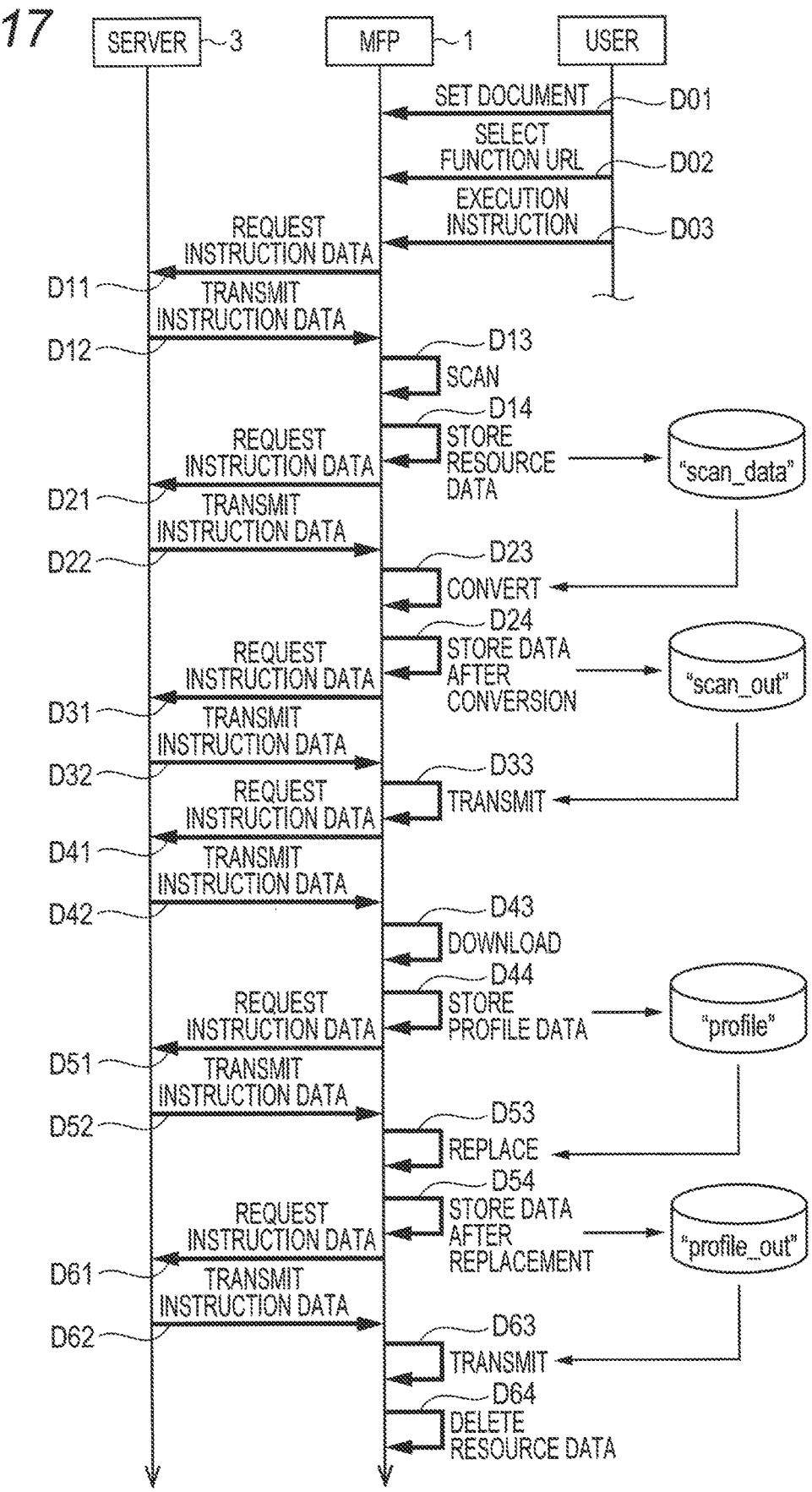
FIG. 17 is a sequence chart showing the procedure of a fourth additional function.

Next, the fourth additional function will be described with reference to FIG. 17. The fourth additional function is an additional function that combines scanning, conversion, replacement, and two kinds of output. When executing the fourth additional function, the user sets a document in the MFP 1 (D01), selects a function URL indicating the fourth additional function (D02), and gives an instruction for the execution (D03, S102 in FIG. 2).

The MFP 1 requests the server 3 to transmit the instruction data based on the instructed function URL (D11), and receives the instruction data from the server 3 (D12). In the fourth additional function, the instruction data corresponding to the function URL is the input-type instruction data instructing to perform scanning. The MFP 1 executes a scan process based on the received instruction data (D13), and stores the scan result as a resource data file (D14).

The MFP 1 requests the server 3 to transmit the next instruction data (D21), and receives the instruction data from the server 3 (D22). The instruction data received in D22 is the processing-type instruction data instructing to perform the conversion. The MFP 1 executes a conversion process based on the received instruction data (D23), and stores the resource data file after conversion (D24). In D24, the MFP 1 stores, for example, a resource data file of the PDF format.

The MFP 1 requests the server 3 to transmit the next instruction data (D31), and receives the instruction data from the server 3 (D32). The instruction data received in D32 is the output-type instruction data instructing to perform transmission. The MFP 1 executes the resource output process and transmits the resource data file stored in D24 to the specified destination (D33).

The MFP 1 requests the server 3 to transmit the next instruction data (D41), and receives the instruction data from the server 3 (D42). The instruction data received in D42 is the input-type instruction data instructing to perform the download. The MFP 1 executes downloading as a resource input process (D43) based on the received instruction data, and stores the downloaded data as a resource data file (D44). The content data downloaded in D43 is, for example, the profile 60 before replacement shown in FIG. 11B. The profile 60 before replacement includes, for example, reserved words corresponding to information indicating the user or device that has performed the scan, information indicating the scan settings, and so on.

The MFP 1 requests the server 3 to transmit the next instruction data (D51), and receives the instruction data from the server 3 (D52). The instruction data received in D52 is the processing-type instruction data instructing to perform the replacement. The MFP 1 replaces the reserved word included in the profile 60 before replacement based on the received instruction data (D53), and stores the resource data after replacement (D54). The resource data stored in D54 is, for example, the profile 61 after replacement shown in FIG. 11C. The profile 61 after replacement contains information, as text, on the scan which has been performed by the MFP 1 in D13. The instruction data instructing to perform replacement includes, for example, format information instructing to perform output in the PDF format.

The MFP 1 requests the server 3 to transmit the next instruction data (D61), and receives the instruction data from the server 3 (D62). The instruction data received in D62 is the output-type instruction data instructing to perform transmission. The MFP 1 transmits the profile 61 after replacement of the PDF format to the specified destination (D63). The instruction data received in D62 does not include the instruction data information. The MFP 1 deletes all the resource data files created by the fourth additional function (D64, S122 in FIG. 2), and ends the process of the fourth additional function. In D64, the MFP 1 deletes all the resource data files stored in, for example, D14, D24, D44, and D54.

In the fourth additional function, the MFP 1 performs scanning and outputs the result thereof, and creates and outputs a profile for collecting the scanning information. In the fourth additional function, the scan instruction data received in D12 is an example of the first input instruction data, the conversion instruction data received in D22 is an example of the first processing instruction data, and the transmission instruction data received in D32 is an example of the first output instruction data. The download instruction data received in D42 is an example of the second input instruction data, the replacement instruction data received in D52 is an example of the second processing instruction data, and the transmission instruction data received in D62 is an example of the second output instruction data. The profile 60 before replacement downloaded in D43 is an example of profile content data, and the resource data file stored in D44 is an example of profile resource data.

The transmission in D33 may be performed after the download in D43 or the replacement in D53, or after the transmission in D63. The output of the scan data and the output of the profile 61 after replacement may be printing instead of transmission, or may be both transmission and printing. Instead of outputting the profile 61 after replacement as a file separate from the scan data, the profile 61 may be transmitted by being added to the scan data. For example, an additional function is designed by which, after converting scan data to the PDF format, the information of the profile 61 after replacement is embedded in the profile area of the PDF format file.

Figure 18:
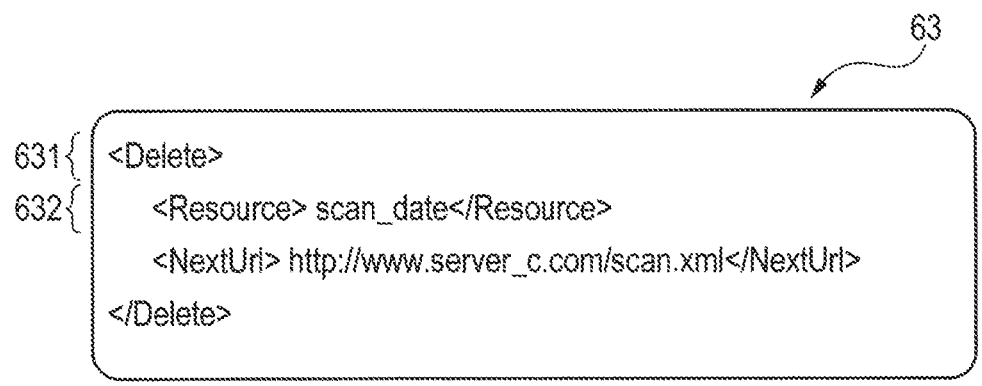
FIG. 18 is an explanatory diagram showing an example of instruction data of a deletion instruction.

Another type of the instruction data may include a deletion process of a resource data file. The MFP 1 may be configured to execute processes based on instruction data including <Delete> indicating deletion of a resource data file as a kind tag, for example. The instruction data 63 shown in FIG. 18 is an example of deletion instruction data. The instruction data 63 includes a kind tag 631 indicating deletion and identification information 632 indicating resource data of a deletion target. The kind tag 631 indicating deletion is an example of deletion information.

In a case where the instruction data acquired in S103 of the additional function process is the instruction data 63 shown in FIG. 18, the CPU 11 identifies the resource data file associated with the identification information 632 stored in S111, and deletes the identified resource data file. S111 in this case is an example of the second deletion process.

For example, a problem may occur if the CPU 11 executes a process of, based on the instruction data, storing a new resource data file associated with the same identification information as the identification information of the resource data file that already exists. Since a resource data file is individually deleted according to the instruction data, an additional function may be designed such that a resource data file is deleted at user's desired timing, and a resource data file associated with the same identification information is used while changing the content data.

As described above in detail, when the MFP 1 of this embodiment receives an execution instruction of the additional function, the MFP 1 receives the instruction data based on the access information. The instruction data received by the MFP 1 includes input-type instruction data and output-type instruction data, and further includes an instruction to receive the next instruction data based on the instruction data information. Since the content data is specified using the identification information of the resource data in the input-type instruction data and the output-type instruction data, the input-type instruction data and the output-type instruction data are prepared separately. Therefore, regarding a series of processes based on the instruction data, the combination of the processes related to the input and the processes related to the output is customized, which increases flexibility in a series of processes that are executable by the instruction data. Since various series of processes are realized, processes requiring customization are realized without updating firmware.

In the MFP 1 of this embodiment, the processing-type instruction data is prepared and resource data is processed, which enables a series of processes such as performing various types of processing on the inputted resource data and outputting new resource data. As a result, the variations of a series of processes that are executable by the instruction data increase, and processes with high added values are realized. For example, since the composition process is set as the processing-type process, the MFP 1 uses new content data obtained by combining a plurality of content data as resource data. Since the layout instruction is used in the composition process, an additional function to create resource data of a desired layout is designed to further increase flexibility. Since the layout instruction is prepared as layout information 58 separate from the instruction data and the layout information 58 is inputted based on the input-type instruction data, the instruction data of the composition instruction has a simple structure.

After the series of processes of the additional function is completed, the MFP 1 of this embodiment automatically deletes the resource data stored as the result of executing the series of processes according to the instruction data. In this way, the load on the memory 12 that stores the resource data is reduced. Further, the MFP 1 of this embodiment also deletes resource data individually according to the instruction data of the deletion instruction. Thus, the resource data is deleted at any user's desired timing. For example, the resource data may be deleted immediately when it is no longer needed without waiting for the end of the series of processes.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

For example, the image processing apparatus is not limited to the MFP 1, but may be applied to any apparatus having an image processing function and a communication function via a network, such as a printer, a scanner, a copier, and a fax machine.

In the embodiment, a system configuration including one server 3 for storing instruction data and one storage 4 for storing content data is exemplified, but two or more servers or two or more storages may be included. Both the instruction data and the content data may be stored in one server and so on.

In the embodiment, the user selects an additional function of an execution target and gives an execution instruction, but there may be an additional function of which the execution timing is specified in advance. For example, the MFP 1 may accept the designation of the execution timing when registering an additional function. The execution timing is, for example, a particular time such as every day or every week, every particular time, and when the power of the MFP 1 is turned on. In a case where an additional function of which the execution timing is specified is registered, the MFP 1 starts processes from S103 of the additional function process shown in FIG. 2 when the execution timing is reached, and requests the server 3 to transmit the instruction data based on the function URL.

In the embodiment, the MFP 1 stores each resource data in the memory 12, but it is not limited to the memory 12, and any storage area in which data is written or read from the MFP 1 may be used. For example, a USB memory mounted on the MFP 1 or a network storage may be used. That is, the MFP 1 may store the resource data file in the USB memory or the network storage. In that case, the MFP 1 stores, for example, the identification information of the resource data and the information indicating the storage location of the resource data file in association with each other.

In the embodiment, the identification information of the resource data is used as the file name of the resource data file as it is. Alternatively, the file name of the resource data file may be a file name including the identification information of the resource data. For example, in S201 of the scan process, S211 of the resource input process, S241 of the conversion process, S251 of the composition process, and S261 of the replacement process, the MFP 1 may create a resource data file with a file name including the identification information of the specified resource data. In this case, in S221 of the print process, S231 of the resource output process, S242 of the conversion process, S252 of the composition process, and S262 of the replacement process, the MFP 1 identifies, as a resource data file, a file with a file name including the identification information of the resource data.

The MFP 1 may store the relationship between the identification information of the resource data and the file name of the resource data file, as the correspondence data and so on. For example, in S201 of the scan process, S211 of the resource input process, S241 of the conversion process, S251 of the composition process, and S261 of the replacement process, the MFP 1 may store the file name of the created resource data file and the instructed identification information as the correspondence data. In this case, in S221 of the print process, S231 of the resource output process, S242 of the conversion process, S252 of the composition process, and S262 of the replacement process, the MFP 1 refers to the correspondence data to identify the resource data file corresponding to the instructed identification information. In this case, when deleting the resource data in S122 of the additional function process, the MFP 1 not only deletes the resource data file, but also deletes the correspondence data or deletes the information related to the resource data file in the correspondence data.

In the embodiment, the instruction data 51 of the scan instruction is specified by the kind tag <Scan> different from the kind tag <Input> of the instruction data 52 instructing to perform input. Alternatively, the instruction data 51 may include the same kind tag <Input> as the instruction data 52 and may include information indicating scan as the input method. The instruction data 53 of the print instruction is specified by the kind tag <Print> different from the kind tag <Output> of the instruction data 54 instructing to perform output. Alternatively, the instruction data 53 may include the same kind tag <Output> as the instruction data 54 and may include information indicating printing as the output method.

In the embodiment, the identification information of the resource data is fixed information embedded in each instruction data. Alternatively, the identification information may be a serial number and so on that is automatically assigned by the MFP 1 at the time of execution. In this case, for example, in the process of creating and storing resource data files such as S201 of the scan process, S211 of the resource input process, S241 of the conversion process, S251 of the composition process, and S261 of the replacement processing, the MFP 1 assigns a number and determines the file name of the resource data file, and transmits the determined file name to the server 3 as identification information. When the server 3 transmits the instruction data, the server 3 transmits the instruction data including the file name received from the MFP 1.

The MFP 1 may accept an input of the user who specifies the identification information of the resource data. For example, the instruction data stored in the server 3 may include display instruction data instructing to perform screen display. For example, a screen for accepting selection of resource data of the download target may be displayed and the identification information of the resource data may be determined based on the user's selection. In this case, the instruction data instructing to store the resource data file may not include the identification information of the resource data, and the MFP 1 may display the file names of the resource data files stored in the memory 12 and accept the user's selection.

In the embodiment, the instruction data of the scan instruction and the instruction data of the print instruction include the setting information related to the process, but the scan setting and the print setting may not be included. In a case where the setting information is not included, the MFP 1 may use a default setting stored in advance in the memory 12. Further, in the embodiment, the processing-type instruction data includes the format information indicating the file format of the resource data after processing, but the format information may not be included. In a case where the format information is not included, the MFP 1 may store the data in the same file format as the resource data before processing, or may store the data in a default file format stored in advance in the memory 12.

For example, when the MFP 1 stores new resource data in association with the same identification information as the identification information of already existing resource data, the MFP 1 may overwrite the resource data. In that case, the MFP 1 may not support the kind tag indicating the deletion instruction.

In any of the flowcharts disclosed in the embodiments, the plurality of processes in any of the plurality of steps may be arbitrarily changed in the execution order or executed in parallel as long as the process contents do not conflict with each other.

The processes disclosed in the embodiment may be executed by a single CPU, a plurality of CPUs, hardware such as an ASIC, or a combination thereof. Further, the processes disclosed in the embodiment may be realized in various modes such as a storage medium storing a program for executing the processes, a method, and so on.

What is claimed is:

1. An image processing apparatus comprising:
a communication interface; and
a controller configured to:
   acquire first access information indicating a transmission source of instruction data, the instruction data being data instructing the image processing apparatus to execute a process, the image processing apparatus being configured to execute an input-type process and an output-type process, an input-type instruction data being the instruction data indicating the input-type process, the input-type instruction data being one kind of the instruction data, the input-type instruction data including input process information, the input-type instruction data including input method information and input resource identification information, the input method information indicating an input method, the input resource identification information identifying resource data to be stored, an output-type instruction data being the instruction data indicating the output-type process, the output-type instruction data being one kind of the instruction data, the output-type instruction data including output process information, the output-type instruction data including output method information and output resource identification information, the output method information indicating an output method, the output resource identification information identifying resource data to be read, the instruction data further including reception instruction information instructing the image processing apparatus to receive next instruction data, the reception instruction information being associated with second access information indicating a transmission source of the next instruction data;
   receive, via the communication interface, the instruction data transmitted from the transmission source of the instruction data based on the acquired first access information;
   in response to receiving the input-type instruction data, input content data of a storage target by the input method corresponding to the input method information, the input method information being information included in the received input-type instruction data, and store resource data in which the inputted content data is associated with the input resource identification information included in the received input-type instruction data;
   in response to receiving the output-type instruction data, read the resource data corresponding to the output resource identification information included in the received output-type instruction data, and output the content data associated with the output resource identification information of the read resource data by the output method corresponding to the output method information, the output method information being information included in the received output-type instruction data, wherein in a case where the content data of an output target is image data, an image indicated by the image data is outputted; and
   in response to receiving the instruction data including the reception instruction information, receive, via the communication interface, the next instruction data from the transmission source of the next instruction data based on the second access information associated with the reception instruction information.

2. The image processing apparatus according to claim 1, wherein the controller is configured to:
   in response to receiving the instruction data not including the reception instruction information, delete the resource data that is stored after starting a first process and before finishing a second process, the first process being a process that is executed based on the instruction data received by acquiring the first access information, the second process being a process that is executed based on the instruction data not including the reception instruction information.

3. The image processing apparatus according to claim 1, wherein the instruction data includes, as kind information indicating a kind of the process to be executed by the image processing apparatus, one of the input process information, the output process information, and deletion information indicating deletion, the instruction data including the deletion information including deletion resource identification information for identifying resource data to be deleted; and
   wherein the controller is configured to:
   in response to receiving the instruction data including the deletion information, delete the resource data corresponding to the deletion resource identification information included in the received instruction data.

4. The image processing apparatus according to claim 1, wherein the image processing apparatus is configured to further execute a processing-type process, a processing-type instruction data being the instruction data indicating the processing-type process, the processing-type instruction data being one kind of the instruction data, the processing-type instruction data including processing process information indicating the processing-type process, the processing-type instruction data including processing method information, first resource identification information, and second resource identification information, the processing method information indicating a processing method, the first resource identification information identifying resource data to be read, the second resource identification information identifying resource data to be stored; and
   wherein the controller is configured to:
   in response to receiving the processing-type instruction data, read the resource data corresponding to the first resource identification information included in the received processing-type instruction data, apply the processing-type process to the read resource data by the processing method corresponding to the processing method information, the processing method information being information included in the received processing-type instruction data, and store new resource data in which the resource data after the processing-type process is associated with the second resource identification information included in the received processing-type instruction data, thereby performing the processing-type process.

5. The image processing apparatus according to claim 4, wherein the processing-type instruction data includes, as the processing method, composition instruction information indicating composition; and wherein the controller is configured to:
in response to receiving the processing-type instruction data including the composition instruction information, read the resource data corresponding to the first resource identification information included in the received processing-type instruction data, generate new content data by combining a plurality of content data including the read resource data, and store the new resource data in which the generated new content data is associated with the second resource identification information included in the received processing-type instruction data.

6. The image processing apparatus according to claim 5, wherein the controller is configured to:
in response to receiving the processing-type instruction data including the composition instruction information, read the resource data corresponding to the first resource identification information included in the received processing-type instruction data, acquire a layout instruction indicating a layout of the combined plurality of content data, generate the new content data in which the plurality of content data including the read resource data is arranged in accordance with the layout indicated by the acquired layout instruction, and store the new resource data in which the generated new content data is associated with the second resource identification information included in the received processing-type instruction data.

7. The image processing apparatus according to claim 6, wherein the input-type instruction data includes, as the input method, download instruction information indicating download, the input-type instruction data including input source information indicating an input source;
wherein the controller is configured to:
in response to receiving the input-type instruction data including the download instruction information, receive content data via the communication interface from the input source based on the input source information included in the received input-type instruction data, and store the resource data in which the received content data is associated with the input resource identification information included in the received input-type instruction data, the content data received from the input source including layout content data in which the layout instruction is described;
in response to receiving the layout content data, store layout resource data in which the received layout content data is associated with the input resource identification information included in the received input-type instruction data, the layout content data received from the input source including layout resource identification information for identifying resource data of a layout target; and
in response to receiving the processing-type instruction data including the composition instruction information and including identification information of the layout resource data as the first resource identification information, read the layout resource data, read the resource data corresponding to the layout resource identification information included in the layout content data of the read layout resource data, generate the new content data in which the plurality of content data including the read resource data is arranged in accordance with the layout indicated in the layout instruction described in the layout content data of the read layout resource data, and store the new resource data in which the generated new content data is associated with the second resource identification information included in the received processing-type instruction data.

8. The image processing apparatus according to claim 5, wherein the controller is configured to:
in the output-type process, output content data of a particular image format as a file format, the particular image format being a file format including a plurality of content data and arrangement information indicating a layout of the plurality of content data; and
in response to receiving the processing-type instruction data including the composition instruction information, read the resource data corresponding to the first resource identification information included in the received processing-type instruction data, generate the new content data of the particular image format including the plurality of content data and the arrangement information, the plurality of content data including the read resource data, the arrangement information being obtained by converting information indicating the layout of the plurality of content data into information of a format specified by the particular image format, and store the new resource data in which the generated new content data is associated with the second resource identification information included in the received processing-type instruction data.

9. The image processing apparatus according to claim 4, wherein the processing-type instruction data includes conversion instruction information indicating conversion as the processing method;
wherein the resource data is stored as a file; and
wherein the controller is configured to:
in response to receiving the processing-type instruction data including the conversion instruction information, read the resource data corresponding to the first resource identification information included in the received processing-type instruction data, convert a file format of the read resource data, and store the new resource data in which resource data after conversion is associated with the second resource identification information included in the received processing-type instruction data.

10. The image processing apparatus according to claim 4, wherein the image processing apparatus is configured to acquire reservation information indicating that a particular text is replaced in accordance with a predetermined definition;
wherein the processing-type instruction data includes replacement instruction information indicating replacement as the processing method; and
wherein the controller is configured to:
in response to receiving the processing-type instruction data including the replacement instruction information, read the resource data corresponding to the first resource identification information included in the received processing-type instruction data, replace the particular text corresponding to the reservation information included in the content data of the read resource data, and store the new resource data in which content data after replacement is associated with the second resource identification information included in the received processing-type instruction data.

11. The image processing apparatus according to claim 4, wherein the input-type instruction data includes scan instruction information indicating scan as the input method;
wherein the processing-type instruction data includes conversion instruction information indicating conversion as the processing method;

wherein the output-type instruction data includes first output instruction information or second output instruction information as the output method information; and wherein the controller is configured to:

in response to receiving the input-type instruction data and determining that the received input-type instruction data includes the scan instruction information and includes the reception instruction information, as the input-type process, scan a document, store the resource data in which the content data indicating a scan result is associated with the input resource identification information included in the received input-type instruction data, and receive processing-type instruction data as the next instruction data;

in response to determining that the received processing-type instruction data includes the conversion instruction information and that the first resource identification information is same as the input resource identification information included in the input-type instruction data and that the received processing-type instruction data includes the reception instruction information, as the processing-type process, read the resource data stored by the input-type process based on the input-type instruction data, convert a file format of the read resource data, store the new resource data in which the resource data after conversion is associated with the second resource identification information included in the received processing-type instruction data, and receive, as the next instruction data, first output instruction data that is the output-type instruction data;

in response to determining that the received first output instruction data includes the first output instruction information and that the output resource identification information is same as the second resource identification information included in the processing-type instruction data and that the received first output instruction data includes the reception instruction information, as the output-type process, read the resource data stored by the processing-type process based on the processing-type instruction data, output the content data associated with the output resource identification information of the read resource data by the output method corresponding to the first output instruction information, and receive, as the next instruction data, second output instruction data that is the output-type instruction data; and in response to determining that the received second output instruction data includes the second output instruction information and that the output resource identification information is same as the second resource identification information included in the processing-type instruction data, as the output-type process, read the resource data stored by the processing-type process based on the processing-type instruction data, and output the content data associated with the output resource identification information of the read resource data by the output method corresponding to the second output instruction information.

12. The image processing apparatus according to claim 4, wherein the input-type instruction data includes first input instruction information or second input instruction information as the input method information;

wherein the processing-type instruction data includes composition instruction information indicating composition as the processing method; and wherein the controller is configured to:

in response to receiving first input instruction data as the input-type instruction data and determining that the received first input instruction data includes the first input instruction information and the reception instruction information, as the input-type process, input content data by the input method corresponding to the first input instruction information, store the resource data in which the inputted content data is associated with the input resource identification information included in the received first input instruction data, and receive, as the next instruction data, second input instruction data that is the input-type instruction data;

in response to determining that the received second input instruction data includes the second input instruction information and the reception instruction information, as the input-type process, input content data by the input method corresponding to the second input instruction information, and store the resource data in which the inputted content data is associated with the input resource identification information included in the received second input instruction data, and receive processing-type instruction data as the next instruction data;

in response to determining that the received processing-type instruction data includes the composition instruction information and the reception instruction information, as the processing-type process, read first resource data and second resource data, the first resource data being the resource data corresponding to the input resource identification information included in the first input instruction data, the second resource data being the resource data corresponding to the input resource identification information included in the second input instruction data, acquire a layout instruction indicating a layout of content data for composition, generate the new content data in which the read first resource data and the second resource data are arranged in accordance with the layout set in the acquired layout instruction, store the new resource data in which the generated new content data is associated with the second resource identification information included in the received processing-type instruction data, and receive output-type instruction data as the next instruction data; and in response to determining that the output resource identification information in the received output instruction data is same as the second resource identification information included in the processing-type instruction data, as the output-type process, read the resource data stored by the processing-type process based on the processing-type instruction data, and output the content data associated with the output resource identification information of the read resource data by the output method corresponding to the output method information, the output method information being information included in the received output-type instruction data.

13. The image processing apparatus according to claim 4, wherein the input-type instruction data includes, as the input method, download instruction information indicating download or scan instruction information indicating scan, wherein the input-type instruction data including the download instruction information includes input source information indicating an input source;

wherein the processing-type instruction data includes composition instruction information indicating composition as the processing method; and wherein the controller is configured to:

in response to receiving first input instruction data as the input-type instruction data and determining that the received first input instruction data includes first input instruction information indicating one of the download instruction information and the scan instruction information and determining that the received first input instruction data includes the reception instruction information, as the input-type process, input content data by the input method corresponding to the first input instruction information, and store the resource data in which the inputted content data is associated with the input resource identification information included in the received first input instruction data, and receive, as the next instruction data, second input instruction data that is the input-type instruction data;

in response to determining that the received second input instruction data includes second input instruction information indicating another one of the download instruction information and the scan instruction information and determining that the received second input instruction data includes the reception instruction information, as the input-type process, input content data by the input method corresponding to the second input instruction information, and store the resource data in which the inputted content data is associated with the input resource identification information included in the received second input instruction data, and receive, as the next instruction data, third input instruction data that is the input-type instruction data;

in response to determining that the received third input instruction data includes the download instruction information and the reception instruction information, as the input-type process, receive layout content data in which a layout instruction is described, via the communication interface, from the input source indicated by the input source information included in the third input instruction data, and store layout resource data in which the received layout content data is associated with the input resource identification information included in the received third input instruction data, the received layout content data including the input resource identification information included in the first input instruction data and the input resource identification information included in the second input instruction data, and receive processing-type instruction data as the next instruction data;

in response to determining that the received processing-type instruction data includes the composition instruction information, that the first resource identification information is same as the input resource identification information included in the third input instruction data, and that the received processing-type instruction data includes the reception instruction information, as the processing-type process, read the layout resource data stored by the input-type process based on the third input instruction data, read first resource data and second resource data based on the layout content data of the read layout resource data, the first resource data being the resource data corresponding to the input resource identification information included in the first input instruction data, the second resource data being the resource data corresponding to the input resource identification information included in the second input instruction data, generate the new content data in which the read first resource data and second resource data are arranged in accordance with a layout set in the layout instruction described in the layout content data of the read layout resource data, store the new resource data in which the generated new content data is associated with the second resource identification information included in the received processing-type instruction data, and receive output-type instruction data as the next instruction data; and in response to determining that the output resource identification information in the received output-type instruction data is same as the second resource identification information included in the processing-type instruction data, as the output-type process, read the resource data stored by the processing-type process based on the processing-type instruction data, and output the content data associated with the output resource identification information of the read resource data by the output method corresponding to the output method information, the output method information being information included in the received output-type instruction data.

14. The image processing apparatus according to claim 4, wherein the input-type instruction data includes download instruction information indicating download as the input method, wherein the input-type instruction data including the download instruction information includes input source information indicating an input source;

wherein the processing-type instruction data includes composition instruction information indicating composition as the processing method; and wherein the controller is configured to:

in response to receiving first input instruction data as the input-type instruction data and determining that the received first input instruction data includes the download instruction information and the reception instruction information, as the input-type process, receive content data via the communication interface from the input source indicated by the input source information included in the first input instruction data, and store the resource data in which the received content data is associated with the input resource identification information included in the received first input instruction data, and receive, as the next instruction data, second input instruction data that is the input-type instruction data;

in response to determining that the received second input instruction data includes the download instruction information and the reception instruction information, as the input-type process, receive layout content data in which a layout instruction is described, via the communication interface, from the input source indicated by the input source information included in the second input instruction data, and store layout resource data in which the received layout content data is associated with the input resource identification information included in the received second input instruction data, the layout content data indicating a layout of content data for composition, the layout content data received from the input source including text content data and the input resource identification information included in the first input instruction data, and receive processing-type instruction data as the next instruction data;

in response to determining that the received processing-type instruction data includes the composition instruction information, that the first resource identification information is same as the input resource identification information included in the second input instruction data and that the received processing-type instruction data includes the reception instruction information, as the processing-type process, read the layout resource data that is stored by the input-type process based on the second input instruction data, read the resource data corresponding to layout resource identification information included in the layout content data of the read layout resource data, generate new content data in which the read resource data and the text content data set in the layout instruction are arranged in accordance with the layout instruction described in the layout content data of the read layout resource data, and store the new resource data in which the generated new content data is associated with the second resource identification information included in the received processing-type instruction data, and receive output-type instruction data as the next instruction data; and in response to determining that the output resource identification information in the received output-type instruction data is same as the second resource identification information included in the processing-type instruction data, as the output-type process, read the resource data stored by the processing-type process based on the processing-type instruction data, and output the content data associated with the output resource identification information of the read resource data by the output method corresponding to the output method information, the output method information being information included in the received output-type instruction data.

15. The image processing apparatus according to claim 4, wherein the input-type instruction data includes, as the input method, scan instruction information indicating scan or download instruction information indicating download, wherein the input-type instruction data including the download instruction information includes input source information indicating an input source;

wherein the processing-type instruction data includes, as the processing method, conversion instruction information indicating conversion or replacement instruction information indicating replacement;

wherein the image processing apparatus is configured to acquire reservation information indicating that a particular text is replaced in accordance with a predetermined definition; and wherein the controller is configured to:

in response to receiving first input instruction data as the input-type instruction data and determining that the received first input instruction data includes the scan instruction information and the reception instruction information, as the input-type process, scan a document, and store the resource data in which the content data indicating a scan result is associated with the input resource identification information included in the received first input instruction data, and receive, as the next instruction data, first processing instruction data that is the processing-type instruction data;

in response to determining that the received first processing instruction data includes the conversion instruction information, that the first resource identification information is same as the input resource identification information included in the first input instruction data and that the received first processing instruction data includes the reception instruction information, as the processing-type process, read the resource data stored by the input-type process based on the first input instruction data, convert a file format of the read resource data, and store the new resource data in which the resource data after conversion is associated with the second resource identification information included in the received first processing instruction data, and receive, as the next instruction data, first output instruction data that is the output-type instruction data;

in response to determining that the output resource identification information in the received first output instruction data is same as the second resource identification information included in the first processing instruction data and that the received first output instruction data includes the reception instruction information, as the output-type process, read the resource data stored by the processing-type process based on the first processing instruction data, and output the content data associated with the output resource identification information of the read resource data by the output method corresponding to the output method information, the output method information being information included in the received first output instruction data, and receive, as the next instruction data, second input instruction data that is the input-type instruction data;

in response to determining that the received second input instruction data includes the download instruction information and the reception instruction information, as the input-type process, receive profile content data in which a profile is described, via the communication interface, from the input source indicated by the input source information included in the second input instruction data, and store profile resource data in which the received profile content data is associated with the input resource identification information included in the received second input instruction data, the received profile content data including the reservation information corresponding to a scan setting as the profile, and receive, as the next instruction data, second processing instruction data that is the processing-type instruction data;

in response to determining that the received second processing instruction data includes the replacement instruction information, that the first resource identification information is same as the input resource identification information included in the second input instruction data and that the received second processing instruction data includes the reception instruction information, as the processing-type process, read the profile resource data that is stored by the input-type process based on the second input instruction data, replace the particular text that is the reservation information included in the profile content data of the read profile resource data, and store the new resource data in which content data after replacement is associated with the second resource identification information included in the received second processing instruction data, and receive, as the next instruction data, second output instruction data that is the output-type instruction data; and in response to determining that the output resource identification information in the received second output instruction data is same as the second resource identification information included in the second processing instruction data, as the output-type process, read the resource data stored by the processing-type process based on the second processing instruction data, and output the content data associated with the output resource identification information of the read resource data by the output method corresponding to the output method information, the output method information being information included in the received second output instruction data.

16. An image processing system comprising an image processing apparatus and a server,
the image processing apparatus configured to:
acquire first access information indicating a transmission source of instruction data, the instruction data being data instructing the image processing apparatus to execute a process, the image processing apparatus being configured to execute an input-type process and an output-type process, an input-type instruction data being the instruction data indicating the input-type process, the input-type instruction data being one kind of the instruction data, the input-type instruction data including input process information, the input-type instruction data including input method information and input resource identification information, the input method information indicating an input method, the input resource identification information identifying resource data to be stored, an output-type instruction data being the instruction data indicating the output-type process, the output-type instruction data being one kind of the instruction data, the output-type instruction data including output process information, the output-type instruction data including output method information and output resource identification information, the output method information indicating an output method, the output resource identification information identifying resource data to be read, the instruction data further including reception instruction information instructing the image processing apparatus to receive next instruction data, the reception instruction information being associated with second access information indicating a transmission source of the next instruction data; and
based on the first access information, transmit, to the server, a request for transmitting the instruction data;
the server configured to:
in response to receiving the request for transmitting the instruction data, transmit the instruction data to the image processing apparatus;
the image processing apparatus configured to:
receive the instruction data transmitted from the server;
in response to receiving the input-type instruction data from the server, input content data of a storage target by the input method corresponding to the input method information, the input method information being information included in the received input-type instruction data, and store resource data in which the inputted content data is associated with the input resource identification information included in the received input-type instruction data;
in response to receiving the output-type instruction data from the server, read the resource data corresponding to the output resource identification information included in the received output-type instruction data, and output the content data associated with the output resource identification information of the read resource data by the output method corresponding to the output method information, the output method information being information included in the received output-type instruction data, wherein in a case where the content data of an output target is image data, an image indicated by the image data is outputted; and
in response to receiving the instruction data including the reception instruction information from the server, receive the next instruction data from the transmission source of the next instruction data based on the second access information associated with the reception instruction information.

17. A non-transitory computer-readable storage medium storing a set of program instructions for an image processing apparatus, the set of program instructions, when executed by a controller of the image processing apparatus, causing the image processing apparatus to:
acquire first access information indicating a transmission source of instruction data, the instruction data being data instructing the image processing apparatus to execute a process, the image processing apparatus being configured to execute an input-type process and an output-type process, an input-type instruction data being the instruction data indicating the input-type process, the input-type instruction data being one kind of the instruction data, the input-type instruction data including input process information, the input-type instruction data including input method information and input resource identification information, the input method information indicating an input method, the input resource identification information identifying resource data to be stored, an output-type instruction data being the instruction data indicating the output-type process, the output-type instruction data being one kind of the instruction data, the output-type instruction data including output process information, the output-type instruction data including output method information and output resource identification information, the output method information indicating an output method, the output resource identification information identifying resource data to be read, the instruction data further including reception instruction information instructing the image processing apparatus to receive next instruction data, the reception instruction information being associated with second access information indicating a transmission source of the next instruction data;
receive, via a communication interface of the image processing apparatus, the instruction data transmitted from the transmission source of the instruction data based on the acquired first access information;
in response to receiving the input-type instruction data, input content data of a storage target by the input method corresponding to the input method information, the input method information being information included in the received input-type instruction data, and store resource data in which the inputted content data is associated with the input resource identification information included in the received input-type instruction data;
in response to receiving the output-type instruction data, read the resource data corresponding to the output resource identification information included in the received output-type instruction data, and output the content data associated with the output resource identification information of the read resource data by the output method corresponding to the output method information, the output method information being information included in the received output-type instruction data, wherein in a case where the content data of an output target is image data, an image indicated by the image data is outputted; and in response to receiving the instruction data including the reception instruction information, receive, via the communication interface, the next instruction data from the transmission source of the next instruction data based on the second access information associated with the reception instruction information.

* * * * *